(12) United States Patent
Poppe et al.

(10) Patent No.: US 9,169,405 B2
(45) Date of Patent: Oct. 27, 2015

(54) HIGHLY SCRATCH-RESISTANT COATINGS HAVING GOOD WEATHERING AND CRACK RESISTANCE

(75) Inventors: Andreas Poppe, Shanghai (CN); Egon Wegner, Greven (DE); Michael Kutschera, Chieming (DE); Manfred Essig, Otterberg (DE)

(73) Assignee: BASF COATINGS GMBH, Munster (DE)

( * ) Notice: Subject to any disclaimer, the term of this patent is extended or adjusted under 35 U.S.C. 154(b) by 807 days.

(21) Appl. No.: 12/531,347

(22) PCT Filed: Jan. 23, 2008

(86) PCT No.: PCT/EP2008/000487
§ 371 (c)(1),
(2), (4) Date: Feb. 17, 2010

(87) PCT Pub. No.: WO2008/110230
PCT Pub. Date: Sep. 18, 2008

(65) Prior Publication Data
US 2010/0167033 A1 Jul. 1, 2010

(30) Foreign Application Priority Data
Mar. 15, 2007 (DE) .......................... 10 2007 013 242

(51) Int. Cl.
*B32B 7/02* (2006.01)
*B05D 3/02* (2006.01)
(Continued)

(52) U.S. Cl.
CPC ................ *C09D 7/125* (2013.01); *B05D 7/577* (2013.01); *C08J 3/245* (2013.01); *C09D 133/04* (2013.01); *C09D 161/28* (2013.01); *C08L 33/04* (2013.01); *C08L 61/28* (2013.01); *C08L 75/04* (2013.01)

(58) Field of Classification Search
CPC ....... B05D 7/577; C08J 7/245; C09D 133/04; C09D 161/28; C09D 7/125; C08L 33/04; C08L 61/28; C08L 75/04
USPC ................ 428/212–220, 332–337, 339–341, 428/423.1, 446–447; 528/10–85
See application file for complete search history.

(56) References Cited

U.S. PATENT DOCUMENTS

| 4,278,783 A | 7/1981 | Taniyama et al. |
| 4,499,150 A | 2/1985 | Dowbenko et al. |

(Continued)

FOREIGN PATENT DOCUMENTS

| CN | 1092086 A | 9/1994 |
| DE | 2003579 A | 7/1970 |

(Continued)

OTHER PUBLICATIONS

International Search Report; International Application No. PCT/EP2008/000487; International Filing Date: Jan. 23, 2008; Date of Mailing: Apr. 22, 2008; 5 pages.

(Continued)

*Primary Examiner* — Prashant J Khatri
(74) *Attorney, Agent, or Firm* — Cantor Colburn LLP

(57) ABSTRACT

Disclosed is an at least partly crosslinked coating (K) composed of a near-surface coating zone (K1) and a volume coating zone (K2), the coating obtained from a composition comprising at least two different crosslinkable components (D1) and (D2), at least part of component (D1) having one or more surface-active structural units, wherein (i) the coating both in zone (K1) and in zone (K2) is at least partly crosslinked, and (ii) the crosslinking density of the coating in zone (K1) is higher than the crosslinking density of the coating in zone (K2). Also disclosed are coatings (K) wherein the concentration of component (D1) in the near-surface coating zone (K1) is higher than in the volume coating zone (K2), and the micropenetration hardness and/or the dry scratch resistance of the coating (K) is higher than that of an at least partly crosslinked coating (K') obtained from a composition with no crosslinkable component (D1).

18 Claims, 2 Drawing Sheets

(51) Int. Cl.

| | | |
|---|---|---|
| *C09D 133/04* | (2006.01) | |
| *C08J 3/24* | (2006.01) | |
| *C09D 161/28* | (2006.01) | |
| *C09D 7/12* | (2006.01) | |
| *B05D 7/00* | (2006.01) | |
| *C08L 33/04* | (2006.01) | |
| *C08L 75/04* | (2006.01) | |
| *C08L 61/28* | (2006.01) | |

(56) References Cited

U.S. PATENT DOCUMENTS

| | | | |
|---|---|---|---|
| 4,499,151 A | 2/1985 | Dowbenko et al. | |
| 4,598,131 A | 7/1986 | Prucnal | |
| 4,701,542 A | 10/1987 | Tessier et al. | |
| 5,916,992 A * | 6/1999 | Wilt et al. | 528/15 |
| 5,939,491 A * | 8/1999 | Wilt et al. | 525/100 |
| 6,225,434 B1 * | 5/2001 | Sadvary et al. | 427/407.1 |
| 6,384,119 B1 | 5/2002 | Tye et al. | |
| 6,592,998 B2 * | 7/2003 | Anderson et al. | 428/447 |
| 6,593,417 B1 * | 7/2003 | Anderson et al. | 524/588 |
| 8,013,099 B2 | 9/2011 | Poppe et al. | |
| 2002/0115781 A1 | 8/2002 | Pourreau et al. | |
| 2004/0022706 A1 | 2/2004 | Tani et al. | |
| 2004/0109853 A1 | 6/2004 | McDaniel | |
| 2004/0176529 A1 | 9/2004 | Anderson et al. | |
| 2004/0209088 A1 | 10/2004 | Retsch et al. | |
| 2005/0208312 A1 | 9/2005 | Hazan et al. | |
| 2006/0217472 A1 | 9/2006 | Staunton | |
| 2007/0123621 A1 | 5/2007 | Grandhee et al. | |
| 2008/0057207 A1 * | 3/2008 | Poppe et al. | 427/407.1 |
| 2010/0062168 A1 | 3/2010 | Poppe et al. | |

FOREIGN PATENT DOCUMENTS

| | | | |
|---|---|---|---|
| DE | 3316593 A1 | 11/1984 | |
| DE | 3836370 A1 | 5/1990 | |
| DE | 102004050747 A1 | 4/2006 | |
| DE | 102005045228 A1 | 4/2007 | |
| EP | 0002866 B1 | 7/1981 | |
| EP | 0054105 A1 | 6/1982 | |
| EP | 0465805 A2 | 1/1992 | |
| EP | 0480089 A1 | 4/1992 | |
| EP | 0571073 A2 | 11/1993 | |
| EP | 0245700 B1 | 8/1994 | |
| EP | 0692007 B1 | 1/1996 | |
| EP | 1178088 A2 | 2/2002 | |
| EP | 1295914 B1 | 3/2003 | |
| EP | 1371693 A2 | 12/2003 | |
| EP | 1204701 B1 | 9/2005 | |
| JP | H09220518 A | 8/1997 | |
| JP | H11116847 A | 4/1999 | |
| JP | 2003049116 A | 2/2003 | |
| JP | 2004529234 A | 9/2004 | |
| WO | WO0109260 A1 | 2/2001 | |
| WO | WO0109261 A1 | 2/2001 | |
| WO | WO0170891 A1 | 9/2001 | |
| WO | WO0198393 A1 | 12/2001 | |
| WO | WO0204566 A1 | 1/2002 | |
| WO | WO03013199 A2 | 2/2003 | |
| WO | WO03044100 A1 | 5/2003 | |
| WO | WO2005028550 A2 | 3/2005 | |
| WO | WO2006042585 A1 | 4/2006 | |
| WO | WO2006042658 A1 * | 4/2006 | |
| WO | WO2006097387 A1 | 9/2006 | |
| WO | WO2007024838 A1 | 3/2007 | |
| WO | WO2008110230 A1 | 9/2008 | |

OTHER PUBLICATIONS

Written Opinion; International Application No. PCT/EP2008/000487; International Filing Date: Jan. 23, 2008; Date of Mailing: Apr. 22, 2008; 6 pages.

International Preliminary Report on Patentability dated Oct. 6, 2009 for International application No. PCT/EP2008/000487.

International Preliminary Report on Patentability dated Oct. 6, 2009 for International Application No. PCT/EP2008/00441.

International Search Report; International Application No. PCT/EP2008/00441; International Filing Date: Jan. 22, 2008; Date of Mailing: Nov. 17, 2008; 3 pages.

Written Opinion; International Application No. PCT/EP2008/00441; International Filing Date: Jan. 22, 2008; Date of Mailing: Nov. 17, 2008; 5 pages.

Notice of Opposition to corresponding EP Application No. 08707204 by PPG Industries Ohio, Inc., including Affidavit of Kevin Olson, filed Jan. 18, 2012, 23 pages.

Hill, Loren W., "Structure/Property Relationships of Thermoset Coatings", 1991 Joseph J. Mattiello Memorial Lecture, vol. 64, No. 808, May 1992.

BASF Response and enclosures to Notice of Opposition for EP Application No. 08707204 by PPG Industries Ohio, Inc., dated Oct. 4, 2012, 18 pages.

Co-Pending U.S. Appl. No. 12/531,342, filed Jan. 22, 2008, cited as U.S. Pat. No. US2010062168A1 published Mar. 11, 2010.

* cited by examiner

HIGHLY SCRATCH-RESISTANT COATINGS HAVING GOOD WEATHERING AND CRACK RESISTANCE

CROSS REFERENCE TO RELATED APPLICATIONS

This application is a National Phase Application of Patent Application PCT/EP2008/000487 filed on 23 Jan. 2008, which claims priority to DE102007013242.7, filed 15 Mar. 2007, both of which are hereby incorporated by reference.

FIELD OF THE INVENTION

The present invention relates to at least partly crosslinked coatings which are highly scratch-resistant and at the same time exhibit good weathering resistance and crack resistance, and also to a method of controlling the properties of crosslinked coatings.

BACKGROUND OF THE INVENTION

WO05/028550 discloses functional polymers which have a first, surface-active segment and a second, functional segment which generates the desired properties of the functional polymer. These functional polymers are blended with non-modified thermoplastic bulk polymers, and the resulting blends are used to produce moldings or similar articles or to produce coatings, in order to exert targeted control over the properties of the surfaces of the articles or coatings obtained. The surface-active modification of individual film-forming constituents of a coating composition which is crosslinked only after application to give a coating having targeted surface properties is not, however, described in WO05/028550.

Furthermore, the functional polymers described in WO05/028550 are employed for biological or medical applications, such as for cosmetics, for the biocidal treatment of gloves, clothing, medical instruments, and the like, or for the biocidal finishing of air filters and the like, and also for the production of diagnostic chips, by bioactive surface treatment of the chips.

The descriptions do include descriptions of alkoxysilane-functional, surface-active moldings and coatings where the bulk polymers are treated in some cases with polymeric additives which have alkoxysilane groups. The curing of the alkoxysilane groups in those cases is by a number of hours of moisture treatment or by treatment with aqueous acids. This treatment, which is typical in the field of plastics parts, is associated with considerable additional cost and inconvenience in the field of automotive finishing, however, and is therefore undesirable. Moreover, clearcoat materials that are typically employed in the field of automotive finishing are generally incompatible with the aqueous acids required, meaning that it is not possible to transpose the functional coatings described in WO05/028550 to the field of automotive finishing.

Furthermore, the as yet unpublished American patent application with the Ser. No. 11/227,867, of Sep. 15, 2005, describes coating compositions which comprise reaction products (I) of a dimer fatty acid diol with an isocyanatoalkyltrialkoxysilane.

A particular feature of the coatings obtained using these coating compositions is a very high gloss. As the fraction of the reaction products (I) of a dimer fatty acid diol with an isocyanatoalkyltrialkoxysilane in the coating compositions goes up, the hardness and the resistance to solvents, as measured in double rubs with methyl ethyl ketone, goes down. In the field of automotive finishing, however, the demand is increasingly for coatings having an improved hardness and resistance and hence an improved scratch resistance.

EP-B-1 295 914, furthermore, discloses coating compositions featuring an enhanced oil and water repellency effect, these compositions comprising an alkoxysilyl-functional acrylic resin, an acrylic resin containing alkoxysilyl groups and secondary dimethylpolysiloxane chains, a hydroxyl- and epoxy-functional acrylic resin, and a polyester resin having a high acid number. On account of the relatively broad molecular weight distribution of the poly(meth)acrylates with alkoxysilane groups, however, solids contents of less than 50% by weight only are generally realizable in the clearcoat materials. At higher proportions, the coating materials are difficult to process, on account of their high viscosity. On curing, moreover, unwanted Si—O—C nodes may form in competition with the desired Si—O—Si nodes, as a result of transesterification of the —Si(O-alkyl)$_3$ groups with ester units of the adjacent alkyl (meth)acrylate comonomer units, the Si—O—C nodes being hydrolytically labile and leading to reduced chemical resistance on the part of the resulting coating. Since the heavy-duty OEM clearcoats are to have as a high a weathering resistance as possible, it is a concern that, as compared with polyurethane networks, the poly(meth)acrylate networks exhibit a reduced weathering resistance.

That patent, however, describes neither a difference in degree of crosslinking of the coating in the near-surface layer and in the bulk, nor the control of the properties of the coating by means of these differences in the degree of crosslinking.

EP-B-1 204 701 describes coating compositions which as well as nanoparticles comprise a surface-active substance, whereby an accumulation of the nanoparticles at the surface comes about in the coating, leading to improved scratch resistance on the part of the coatings. The extent of such structures is usually low, similar to a chain of beads on the surface.

Owing to the extremely strong interparticulate interactions and to the usually incomplete stabilization of the particles, however, there are frequent instances of particle agglomeration and hence an adverse effect on the leveling and the appearance of the resulting coatings. Furthermore, extremely effective stabilization of the particles is necessary in order to ensure a wide processing window and to avoid possible deposits in the circuit lines. The last-mentioned publication also fails to describe either a difference in degree of crosslinking of the coating in near-surface layer and in the bulk, or the controlling of the properties of the coating by means of these differences in the degree of crosslinking.

Furthermore, DE 10 2004 050 747 A1 and the as yet unpublished German patent application DE P 10 2005 045228.0-44 disclose coating compositions which comprise adducts with alkoxysilane functionality. The coating compositions described therein are cured using suitable catalysts in the presence, if appropriate, of small amounts of water, to form Si—O—Si networks. One of the applications of the coating compositions is as clearcoats in OEM systems. They lead to coatings having very high scratch resistance, but are frequently in need of further improvement in terms of weathering stability and in terms of cracking. A further disadvantage is the high price of the adducts with alkoxysilane functionality, that are included in decidedly large quantities in these coating compositions.

WO01/98393, furthermore, discloses coating compositions featuring enhanced adhesion to aluminum substrates, and comprising not only a hydroxyl-containing binder and an isocyanato-containing crosslinker but also a silane oligomer (B) having at least two isocyanate groups, as an essential constituent, said oligomer (B) being the reaction product of an isocyanate-functional compound (A) with a coupling reagent (X) which contains at least one alkoxysilane-functional group and at least one group that is reactive toward isocyanate groups.

Modifying the silane oligomers (B) with surface-active components is not described in that publication. Hence, although the coatings described in WO01/98393 may have zones of increased degree of crosslinking, the lack of surface modification of at least one of the film-forming components means that these zones of increased degree of crosslinking are distributed at random across the coating as a whole, and the targeted control of the properties of the coating by means of these differences in degree of crosslinking is not possible in the case of the coatings it describes.

US 2006-0217472 A1, furthermore, discloses that the scratch resistance of polyurethane-based coatings can be improved by taking coating compositions which comprise a hydroxyl-containing binder, a crosslinker containing isocyanate groups, and a metal catalyst for the OH/NCO reaction and adding to them an amino silane, such as bis(3-propyl-trimethoxysilyl)amine, or its reaction products with isocyanates. Modifying the aminosilanes with surface-active components, however, is not described in US 2006-0217472 A1, any more than a difference in the degree of crosslinking of the coating in the near-surface layer and in the bulk.

WO 01/09260, finally, discloses coating compositions which comprise polysiloxanes (a) having at least one reactive group, compounds (b) which have at least one group reactive with the reactive groups of the polysiloxanes, and, if appropriate, particles (c), and further constituents. In the curing reaction, therefore, the polysiloxanes do not form an Si—O—Si network with the compounds (b).

This document too fails to describe a difference in degree of crosslinking of the coating in the near-surface layer and in the bulk, and the control of the properties of the coating by means of these differences in degree of crosslinking.

The problem addressed by the present invention is therefore that of providing coating compositions which allow the properties of the resulting coatings to be set in a targeted way. Advantageously it ought to be possible by means of these coating compositions to produce coatings which differ at their surface in at least one property from the properties of the coating in the underlying volume element (bulk).

The aim in particular was to provide coating compositions which lead to coatings having a high micropenetration hardness and a high scratch resistance, more particularly a high dry scratch resistance, as it is known, typically determined in the crockmeter test. At the same time these coatings ought to lead to a highly weathering-stable network. Furthermore, the coating compositions ought to meet the requirements typically imposed in the field of automotive OEM finishing. The coating compositions ought therefore in particular to exhibit good haze, i.e., no haze, good leveling, and a very good overall visual appearance. Finally the desired properties ought to be obtained as inexpensively as possible.

SUMMARY OF THE INVENTION

This problem is surprisingly solved by an at least partly crosslinked coating (K) composed of
1. a near-surface coating zone (K1) and
2. a volume coating zone (K2),
the coating (K) being obtainable from a coating composition (B) which comprises at least two different crosslinkable components (D1) and (D2), at least part of component (D1) having one or more surface-active structural units (O), wherein (i) the coating both in zone (K1) and in zone (K2) is at least partly crosslinked, and
(ii) the crosslinking density of the coating in the near-surface coating zone (K1) is higher than the crosslinking density of the coating in the volume coating zone (K2).

The invention further relates to an at least partly crosslinked coating (K) composed of
1. a near-surface coating zone (K1) and
2. a volume coating zone (K2),
wherein
(I) the coating (K) is obtainable from a coating composition (B) which comprises at least two different crosslinkable components (D1) and (D2), at least part of component (D1) having one or more surface-active structural units (O),
(II) the concentration of component (D1) in the near-surface coating zone (K1) being higher than in the volume coating zone (K2),
wherein the micropenetration hardness and/or the dry scratch resistance of the at least partly crosslinked coating (K) is higher than the micropenetration hardness and/or the dry scratch resistance of an at least partly crosslinked coating (K') obtainable from a coating composition (B') which contains no crosslinkable component (D1).

The invention also provides multicoat effect and/or color paint systems in which the transparent coating is a coating of the invention, and processes for producing these multicoat paint systems.

Lastly the invention also relates to methods of controlling the properties of at least partly crosslinked coatings, wherein the coating (K) is composed of a near-surface coating zone (K1) and a volume coating zone (K2), and the coating (K) is produced from a coating composition (B) which comprises at least two different crosslinkable components (D1) and (D2), at least part of component (D1) having one or more surface-active structural units (O), wherein
(i) the crosslinking density of the network (N1) formed from component (D1) is higher than the crosslinking density of the network (N2) formed from component (D2), and
(ii) the properties of the coating are controlled by way of the ratio of the crosslinking density of the network (N1) formed from component (D1) to the crosslinking density of the network (N2) formed from component (D2).

It is surprising and was unforeseeable that the provision of coating compositions which comprise at least two different crosslinkable components (D1) and (D2) and in which at least part of component (D1) has one or more surface-active structural units (O) makes it possible to control the properties of the resulting coatings in a targeted way via component (D1) and also via the ratio of the crosslinking density of the coating in the near-surface zone (K1) to the crosslinking density of the coating in the volume coating zone (K2). The near-surface coating zone (K1) is more particularly formed substantially by the at least partly crosslinked component (D1), and the volume coating zone (K2) is formed substantially by the at least partly crosslinked component (D2). In accordance with the invention, furthermore, the crosslinking density of the network (N1) formed from component (D1) is higher than the crosslinking density of the network (N2) formed from component (D2). As a result it is possible to improve the scratch resistance, more particularly what is known as the dry scratch resistance, typically determined in the crockmeter test, and/or to improve the hardness of the coating, and at the same time to ensure high weathering resistance and crack resistance. Furthermore, the resulting coatings exhibit very good overall visual appearance and no haze. Finally, the coatings meet the requirements typically imposed on a clearcoat in the field of automotive OEM finishing.

DETAILED DESCRIPTION A PREFERRED EMBODIMENT OF THE INVENTION

At Least Partly Crosslinked Coating (K)

Figure 1:
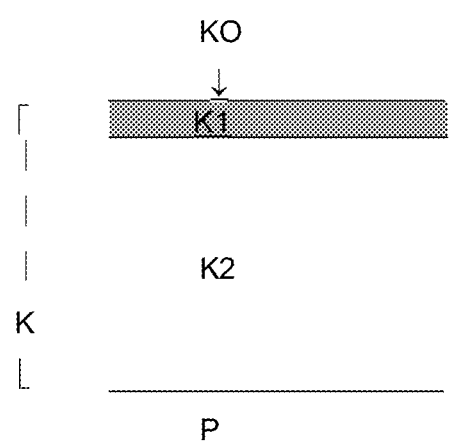
FIG. 1 provides a cross-sectional illustration of the at least partly crosslinked coating (K).

The at least partly crosslinked coating (K) is composed of a near-surface coating zone (K1) and a volume coating zone (K2), as illustrated in FIG. 1. In said FIG. 1 (KO) represents the surface of the coating (K) that is facing away from the substrate or from the pigmented layer (P) located below the coating (K).

The near-surface coating zone (K1) hereinbelow is that part of the at least partly crosslinked coating (K) that is in general parallel to the substrate or to the pigmented layer (P) to which the coating composition (B) is applied, and that forms the air-facing surface (i.e., the substrate-remote surface) of the coating.

The volume coating zone (K2) hereinbelow is that part of the at least partly crosslinked coating (K) that extends in general beneath the near-surface coating zone and that in general is likewise parallel to the substrate or to the pigmented layer (P).

The layer thickness of the near-surface coating zone (K1) is typically between 1 nm and 500 nm, preferably between 10 nm and 200 nm, more preferably between 10 nm and 100 nm, and very preferably between 10 nm and 50 nm, and/or the ratio of the dry film thickness of the near-surface coating zone (K1) to the dry film thickness of the volume coating zone (K2) is less than 0.1, preferably less than 0.01, more preferably less than 0.005.

It is essential to the invention that the coating (K) is at least partly crosslinked not only in the near-surface coating zone (K1) but also in the volume coating zone (K2).

The phrase "at least partly crosslinked" means, in the text below, that the crosslinkable components of the coating composition (B) are in at least partly crosslinked form. The degree of crosslinking here may vary depending on the end use of the coatings and on the crosslinkable components chosen. Typically, however, the degree of crosslinking is between 5% and 100%, preferably between 35% and 100%, more preferably between 50% and 100%, with a degree of crosslinking of 100% denoting complete crosslinking. However, a degree of crosslinking of not more than 85% only may be desired or achievable.

The degree of crosslinking here can be determined, in a way which is known to the skilled worker, by means of various methods, as for example by means of DMTA measurements (DMTA=dynamic mechanical thermoanalysis). Dynamic mechanical thermoanalysis is a widely known measurement method for determining the viscoelastic properties of coatings, and is described, for example, in Murayama, T., Dynamic Mechanical Analysis of Polymeric Material, Elsevier, New York, 1978 and Loren W. Hill, Journal of Coatings Technology, Vol. 64, No. 808, May 1992, pages 31 to 33.

The measurements can be conducted using, for example, the Rheometrics Scientific DMTA V instrument, with a frequency of 1 Hz and an amplitude of 0.2%, and with a heating rate of 2° C. per minute.

The spectroscopic detection of the absence of free functional groups, such as analysis by IR spectroscopy, for example, to show that there are no longer any free isocyanate groups, can be employed, as is known, to detect that crosslinking has taken place.

This crosslinking reaction may take place thermally and/or by means of radiation and/or by means of moisture, but in particular is accomplished thermally, together where appropriate with moisture.

The coating (K) is obtainable from a coating composition (B) which comprises at least two different crosslinkable components (D1) and (D2). It is essential to the invention here that at least part of component (D1) has one or more surface-active structural units (O).

In the text below, the condition that at least part of component (D1) has one or more surface-active structural units (O) denotes the fact that, depending on the end use of the coatings and on the crosslinkable components chosen, typically between 30% and 100%, preferably 50% and 100%, more preferably between 80% and 100%, and very preferably between 90% and 100% of component (D1) have one or more surface-active structural units (O).

As a result of the surface-active structural units of the crosslinkable component (D1) there is, in general, an accumulation of component (D1) in the near-surface coating zone (K1), so that generally, after curing of the coating composition (B), the near-surface coating zone (K1) is formed substantially by the at least partly crosslinked component (D1) and the volume coating zone (K2) is formed substantially by the at least partly crosslinked component (D2). "Substantially" in this context means that at least 50%, preferably at least 75%, and more preferably at least 90% by weight of the respective zone (K1) or (K2) are formed from the respective crosslinked component (D1) or (D2).

Owing to the accumulation of component (D1) in the near-surface coating zone (K1), the at least partly crosslinked coating (K) generally exhibits a chemical disuniformity in the form of a gradient perpendicular to the surface (KO).

This gradient in the chemical disuniformity also leads preferably to a gradient in the physical properties perpendicular to the surface, preferably to a gradient in the scratch resistance and/or stonechip resistance and/or crack resistance and/or washability and/or refinish adhesion and/or wetting and/or optical coloring and/or appearance.

In particular the at least partly crosslinked coating (K) has a chemical disuniformity in the form of a gradient of silicon atoms of type (Si 1) and/or of type (Si 2)

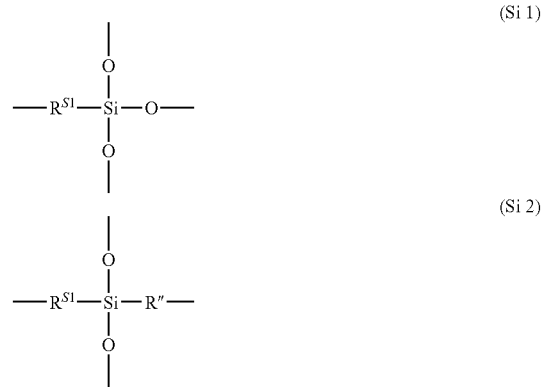

perpendicular to the surface (KO), where
$R^{S1}$=organic radical, preferably linear and/or branched alkylene or cycloalkylene radical having 1 to 20 carbon atoms, more particularly alkylene radical having 1 to 4 carbon atoms, R″=alkyl, cycloalkyl, aryl or aralkyl, the carbon chain possibly being interrupted by nonadjacent oxygen, sulfur or NRa groups, with Ra=alkyl, cycloalkyl, aryl or aralkyl, preferably R″=alkyl radical, more particularly having 1 to 6 C atoms.

This gradient is produced in particular by a corresponding selection of component (D1), preference being given to using components (D1) which crosslink at least partly via alkoxysilane groups. With very particular preference the gradient is obtained via the use of the adducts (A) with silane functionality that are described below.

The gradient preferably has a half-value depth<1 µm, more preferably <0.1 µm, and very preferably <0.05 µm. This half-value depth is the depth or layer thickness of the at least partly crosslinked coating at which the difference (i.e., gradient) in the chemical structure and/or in the physical properties between surface (KO) and volume coating zone (K2) has fallen to a half.

The crosslinking density in the near-surface zone (K1) is generally higher than the crosslinking density in the volume coating zone (K2).

It is assumed that, as a result of this, the at least partly crosslinked coating (K) has a higher hardness, more particularly micropenetration hardness, and a higher scratch resistance, more particularly a higher dry scratch resistance, than a corresponding coating (K') obtained from a coating composition (B') identical to coating component (B) except for the fact that it contains no crosslinkable component (D1). At the same time, the problems often associated with improved scratch resistance, viz. increasing brittleness and susceptibility to cracks, are avoided in the coatings.

By way of the ratio of the crosslinking density of the network (N1) formed from component (D1) to the crosslinking density of the network (N2) formed from component (D2), therefore, it is possible to exert targeted control over the properties of the crosslinked coating (K).

Crosslinkable Component (D1)

The coating (K) is obtainable from a coating composition (B) which comprises at least two different crosslinkable components (D1) and (D2).

It is essential to the invention that at least part of component (D1) has one or more surface-active structural units (O). A surface-active structural unit, here and below, refers to radicals which result in the components featuring this radical accumulating copiously out of the coating composition (B) at the air/coating interface.

In the coating compositions (B) of the invention, accordingly, it is possible to use those components (D1) which from the outset have surface-active structural units (O). A surface-active structural unit is a reference here to radicals which mean that the compounds carrying such a radical accumulate copiously, out of the coating composition, at the air/coating interface.

Use is made in particular, in accordance with the invention, of coating compositions in which the crosslinkable component (D1) has been prepared by modifying at least part of component (D1) with one or more surface-active compounds (OV), the compounds (OV) having the surface-active structural unit (O). Alternatively or additionally it is also possible for at least part of a precursor of component (D1) to have been modified with one or more surface-active compounds (OV). Also possible is the simultaneous reaction with the compound (OV) during the synthesis of the component (D1) (in situ reaction, as it is known).

Surface-Active Structural Unit (O)

The surface-active structural units (O) are preferably selected from the group consisting of hydrocarbon radicals and their derivatives, more particularly of fluorinated hydrocarbon radicals, fatty acid radicals, and the radicals of fatty acid derivatives, and also from the group consisting of unsubstituted or substituted siloxane radicals, and more preferably from siloxane radicals.

The surface-active compound (OV) preferably has at least one hydroxyl, epoxy, isocyanate, carbamate, carboxyl, anhydride, amine and/or thiol group and/or ethylenically unsaturated double bond, and/or the crosslinkable component (D1) and/or a precursor of the crosslinkable component (D1) has a complementary functional group selected from the group consisting of hydroxyl, epoxy, isocyanate, carbamate, carboxyl, anhydride, amine and/or thiol groups and/or ethylenically unsaturated double bonds.

Use is made in particular of compounds (OV) which have a lower surface tension than the nonmodified component (D1) or than the synthesis components used to prepare component (D1). The surface tension of the compound (OV) ought preferably to be at least 1 mN/m and with particular preference at least 5 mN/m lower than the surface tension of the nonmodified component (D1) or than the surface tension of the synthesis components used to prepare component (D1).

The measurement of this surface tension is made at a temperature of 23° C. The method used to determine the surface tension was that known as the ring method. This involves using a ring tensiometer, as it is known, to measure the maximum force which acts on the periphery of a platinum ring when said ring is extracted from the phase boundary of the liquid. The surface of the liquid under investigation is slowly increased for the measurement of the surface tension, the system always being in the equilibrium state. The force needed to increase the surface area is measured, and this measurement is converted to the surface tension. A more detailed elucidation of the method is described in, among other places, the book "Lackeigenschaften messen and steuern" by G. Meichsner, Th. G. Mezger, J. Schröder, edited by Ulrich Zorll, published by Vincentz Verlag 2003, page 96 ff.

The compound (OV) is preferably selected such that the resulting component (D1) having the surface-active structural unit (O) is surface-active in the coating composition. Surface-active components (D1), here and below, are components (D1) which accumulate copiously, out of the coating composition, at the air/coating interface.

This accumulation of component (D1) at the air/coating interface is typically achieved through the existence of a certain incompatibility between component (D1) and the film-forming material (D2). In turn, however, this incompatibility ought not to be too high, in order to prevent flow defects on the part of the coating composition. Furthermore, when using the surface-active components (D1), it is necessary to take account of the other physical limitations on the resulting paint formulation, and also those of the substrate that is to be coated. One particularly important aspect, besides adequate compatibility, is the wetting of the target substrates, in particular. This wetting can be estimated by methods including that of measuring the critical surface tension according to Zismann. A detailed elucidation of this method is described in literature, including the book "Lackeigenschaften messen and steuern" by G. Meichsner, Th. G. Mezger, J. Schröder, edited by Ulrich Zorll, published by Vincentz Verlag 2003. Particular preference is given in this context to those components (D1) which, on their own or in interaction with other interface-active additives, make it possible to set a surface tension for the respective paint formulation that is below the critical surface tension for the particular target substrate.

Particularly preferred components (D1) are those which, on their own or in interaction with other interface-active additives, make it possible to set a surface tension of the respective paint formulation that is at least 5 mN/m below the critical surface tension for the particular target substrate.

As already remarked, compounds suitable as compounds (OV) with low surface tension are those which have at least one surface-active radical. More particularly the surface-active radicals of the compound (O) are selected from the group consisting of hydrocarbon radicals and their derivatives, such as the fluorinated hydrocarbon radicals, the fatty acid radicals and their derivatives, for example, and also from siloxane radicals and their derivatives, such as the fluorinated siloxane radicals, for example.

The surface-active hydrocarbon radicals are, more particularly, linear or branched aliphatic chains which have preferably at least 5 C atoms and more preferably 12 to 36 C atoms and which may if appropriate also carry corresponding substituents, such as fluorine radicals, for example. With regard to the higher homologs, branched structures or structures which as a result of functionalizations do not display crystallization at room temperature are preferred.

Examples of compounds used as compound (OV) with a hydrocarbon radical are, more particularly, alkanes, alkenes, and alkynes and also their derivatives which in addition have at least one functional group as well.

Besides the monofunctional building blocks it is also possible to use compounds (OV) having a functionality of two or more.

Examples of compounds having a relatively low surface tension, which are reactive in relation to the nonmodified component (D1), are, in particular, aliphatic alcohols, fatty acids and fatty acid derivatives having in each case linear or branched aliphatic chains having in general at least 5 C atoms and preferably having 12 to 36 C atoms. Particular preference is given to linear and/or branched fatty acid derivatives having 12-36 C atoms.

Preference is given very generally to the saturated compounds (OV). The reason for this is the high weathering stability the resulting coatings must guarantee.

Examples of possible such compounds include octanol, nonanol, decanol, undecyl alcohol, dodecyl alcohol, and the correspondingly higher homologs. Owing to the relatively low crystallization tendency, preference is given to the use, for example, of isostearyl alcohol (available, for example, under the trade name Isofol from Condea) over the use of n-stearyl alcohol.

Examples of difunctional starting materials include isomers of dihydroxyoctane, isomers of dihydroxynonane, isomers of dihydroxydecane, isomers of dihydroxyundecane, and correspondingly higher homologs.

Also suitable as surface-active building blocks are the derivatives of saturated and/or unsaturated fatty acids, more particularly those of saturated and/or unsaturated fatty acids having 5 to 30 carbon atoms in the molecule, such as radicals of valeric acid, caproic acid, enanthic acid, caprylic acid, pelargonic acid, capric acid, undecylic acid, lauric acid, myristic acid, palmitic acid, stearic acid, oleic acid, elaidic acid, arachidic acid, behenic acid, lignoceric acid, cerotic acid, melissic acid, linoleic acid, ricinenic acid, ricinoleic acid, linolenic acid, arachidonic acid, clupanodonic acid, alpha-eleostearic acid, alpha-licanic acid, alpha-parinaric acid, ricinoleic acid and isanolic acid and mixtures of these fatty acids, and/or the corresponding hydroxy acids of the stated fatty acids, and/or mixtures thereof. Thus as surface-active compound (OV) it is also possible to use hydroxyvaleric acid, hydroxycaproic acid, hydroxystearic acid, hydroxylauric acid, ricinoleic acid or mixtures thereof.

Also suitable, furthermore, are the corresponding radicals of dimer and trimer fatty acids and also mixtures thereof. Mention may be made here, by way of example, of dimer fatty acid diols. They are available commercially, for example, under the designation Pripol® from the company Unichema. They can be prepared by reducing the corresponding dimer fatty acids, as described for example in Karlheinz Hill, "Fats and Oils as Oleochemical Raw Materials,"*Pure Appl. Chem.*, Vol. 72, No. 7, pages 1255-1264 (2000), more particularly page 1261. Suitable, for example, is the commercially available PRIPOL 2033 from Unichema North America, Chicago, Ill., USA.

Epoxidized fatty acids as well can be used as reaction partners for anhydride-functional nonmodified components (D1).

Other examples of corresponding compounds (OV) having a hydrocarbon radical as surface-active radical are amine-functional compounds of low surface tension.

As examples of such compounds mention may be made of octylamine, nonylamine, decylamine, undecylamine, dodecylamine, and the correspondingly higher homologs.

Besides the monofunctional building blocks it is also possible to use compounds (OV) having a functionality of two or more. Examples of difunctional starting materials include isomers of diaminooctane, isomers of diaminononane, isomers of diaminodecane, isomers of diaminoundecane, and corresponding higher homologs.

Besides the amine-functional compounds (OV) it is also possible to employ the corresponding mercapto-functional derivatives.

Furthermore it is also possible in particular to employ isocyanate-functional fatty acid derivatives as compounds (OV). An example that may be mentioned here is stearyl isocyanate, which can be employed, for example, as a reaction partner with nonmodified components (D1) possessing secondary-amine functionality.

In cases requiring a particularly low surface tension on the part of modified component (D1) use is also made, preferably, of organic substances with fluorinated side chains, more particularly fluorinated hydrocarbons. Examples of such compounds are the methacrylates with fluorinated side chains, which can be reacted in Michael addition reactions with amine-functional nonmodified components (D1) or else 3-fluorobenzyl alcohol as an OH-functional component. Furthermore, however, it is also possible to employ other fluorinated substances of low surface tension that are reactive toward the corresponding silanes.

For the reaction with Si—H groups it is also possible to employ various unsaturated oligomers and polymers as compounds (OV). Particularly preferred for use are 1,2-polybutadienes and also various copolymers of 1,2-polybutadienes. In addition it is possible to employ polyisobutylenes having terminal double bonds. Use may also be made, furthermore, of surface-active grafted polymers or grafted polymers with ethylenically unsaturated double bonds in the side chains.

As compound (OV) it is also possible, furthermore, to employ siloxanes or their derivatives.

Suitability is possessed in principle by all polysiloxanes which have on average at least one functional group which is reactive with the complementary functional groups of the nonmodified component (D1). Use is made in particular of polysiloxanes which have at least one hydroxyl, carboxyl, amine and/or thiol group, vinyl, isocyanate and/or epoxy group, more particularly glycidyl group, and/or anhydride group and/or acryloyl and methacryloyl group, more particularly at least one hydroxyl, carboxyl, amine and/or thiol group.

Suitability is possessed for example by polysiloxanes of the formula (I)

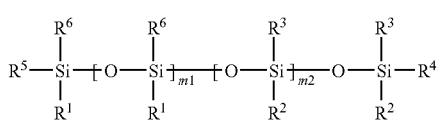

where
$R^1$ to $R^6$ are identical or different radicals and
$R^1$=alkyl, cycloalkyl, aryl or aralkyl radical, the carbon chain possibly being interrupted by nonadjacent oxygen, sulfur or NRa groups, or fluorine-substituted alkyl, cycloalkyl, aryl or aralkyl radicals, preference being given to structures which have an ethylene radical between the silicon atom and the fluorine-substituted organic radical,
$R^2$=hydroxyl, alkyl, cycloalkyl, aryl or aralkyl radical, the carbon chain possibly being interrupted by nonadjacent oxygen, sulfur or NRa groups,
$R^3$ and $R^6$=hydrogen, alkyl, cycloalkyl, aryl or aralkyl radical, the carbon chain possibly being interrupted by nonadjacent oxygen, sulfur or NRa groups, or fluorine-substituted alkyl, cycloalkyl, aryl or aralkyl radicals, preference being given to structures which have an ethylene radical between the silicon atom and the fluorine-substituted organic radical,
$R^4$ and $R^5$=hydrogen, hydroxyl, alkyl, cycloalkyl, aryl or aralkyl radical, the carbon chain possibly being interrupted by nonadjacent oxygen, sulfur or NRa groups,
at least one of the radicals $R^2$, $R^4$, and $R^5$ additionally carrying a functional group which is reactive toward the complementary functional groups of component (D1),
and
$m_1$=1 to 80, preferably 3 to 20, and
$m_2$=0 to 80, preferably 0 to 10.

With preference here the functional group is in each case selected from hydroxyl, carboxyl, amine and/or thiol groups, vinyl, isocyanate and/or epoxy groups, more particularly glycidyl groups, and anhydride groups, and also acryloyl and methacryloyl groups.

Varying the molecular weight of the respective siloxane chains allows targeted variation in the compatibility of the resulting component (D1) with the coating compositions. To obtain high compatibility with the coating compositions, particular preference is given to using siloxanes (OV) of comparatively low molecular weight. These siloxanes are also described in, for example, the application US 20040209088, paragraphs [0017] to [0019], and are explicitly likewise mentioned as preferred ingredients.

In principle the molecular weight of the siloxane employed as compound (OV) may be adapted in accordance with the anticipated compatibility with the coating compositions that are to be modified. However, it has been found that, in many cases, low molecular weights tend to exhibit high compatibility. In light of this, accordingly, preference is given to low molecular weights, which are reflected in the preferred degrees of polymerization $m_1$ and $m_2$.

With regard to the nonfunctional substituents on the respective silicon atoms within the siloxane chain it is likewise possible to make variations in accordance with the anticipated compatibility of the components with the coating compositions that are to be modified. In order to lower the surface tension in a targeted way and hence to obtain the inventive components (D1), it is preferred as nonfunctional radicals to use methyl, ethyl and phenyl radicals and also alkyl radicals which are partly substituted by fluorine. Particular preference is given to using the methyl radical as a nonfunctional radical.

In order to make the silanes more compatible in a targeted way it is also possible to introduce oligomers or polymers of ethylene oxide or of propylene oxide as side chains.

Preference is given to using polysiloxanes of the formula (II):

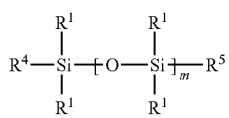

where
$R^1$, $R^4$ and $R^5$ are as defined above and
m=1 to 80, preferably 3 to 20 and more preferably 5 to 12.

Examples of siloxanes with surface-active compound suitability include the compounds specified in paragraphs [0012] to [0018] of the patent application US 20040209088.

In particular, carbinol-functional siloxanes of the above-mentioned formula (II) are employed.

Examples of siloxanes with hydroxyl groups that are suitable as compound (OV) are carbinol-terminated dimethylsiloxane-caprolactone block copolymers (available commercially from ABCR GMBH & CO. KG, Karlsruhe, under article number AB127698), carbinol-functional methyl-siloxane-dimethylsiloxane copolymer (available commercially from ABCR GMBH & CO. KG, Karlsruhe, under article numbers AB127701 and AB127700), carbinol-terminated polydimethylsiloxane (available commercially from ABCR GMBH & CO. KG, Karlsruhe, under article number AB153380), monocarbinol-terminated polydimethylsiloxanes (available commercially from ABCR GMBH & CO. KG, Karlsruhe, under article numbers AB127710 and AB109345 and AB146681 and AB146683 and AB146682), and more particularly the carbinol-functional siloxanes.

Very particular preference is given to functional siloxanes with a symmetric structure, of the formula (III) below:

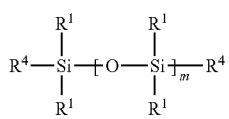

where
$R^1$ and $R^4$ are as defined above and preference is given to methyl, ethyl, and phenyl radicals and also to alkyl radicals partly substituted by fluorine and/or the functional group. Particular preference is given to using the methyl radical as nonfunctional radical, and/or the functional group is preferably a hydroxyl group.

m=1 to 80, preferably 3 to 20, and more preferably 5 to 12.

Very particular preference is given to using siloxanes of the formula (III) where $R^4$ contains a hydroxyl group. It is preferred to use the carbinol-functional polysiloxane Baysilone® OF 502 from GE Bayer Silicones. The material is available in various molecular weights, e.g., Baysilone® OF 502 6% and Baysilone® OF 502 3%. Preferred in this context is the material Baysilone® OF 502 6%, which has a lower molecular weight.

Furthermore, siloxanes with primary or secondary amine functions, in accordance with the formula (II) or (III), are employed with particular preference, an example being aminopropylmethylsiloxane-dimethylsiloxane copolymer (available commercially from ABCR GMBH & CO. KG, Karlsruhe, under article numbers AB109374 and AB109373 and AB109375).

Adducts (A) with Silane Functionality

As crosslinkable groups, component (D1) preferably contains hydrolyzable silane groups, more particularly alkoxysilane groups, since these groups, when component (D1) is crosslinked, form a dense Si—O—Si— network of high scratch resistance that ensures the outstanding properties of the resulting coatings. These components (D1) also lead to the aforementioned gradients of silicon atoms of type (Si 1) and/or (Si 2) in the at least partly crosslinked coating (K) perpendicular to the surface (KO).

Particular preference is given in accordance with the invention to the use as component (D1) of adducts (A) with silane functionality which are preparable by an addition reaction of
(a) at least one silane (S1) which has at least one functional group which is reactive with the complementary functional groups of the compound (OV)
and
(b) at least one compound (OV) which has at least one complementary functional group and at least one surface-active radical.

By addition reaction here is meant nucleophilic, electrophilic, pericyclic or metal-catalyzed addition reactions, of the kind whose mechanisms are also described in the textbooks of organic chemistry, among other references, an example being Organikum, "Reaktionsmechanismen in der Organischen Chemie", Peter Sykes, VCH—Verlag, in detail.

These addition reactions for preparing the adducts (A) with silane functionality are employed in particular for the reaction of the silane (S1) with the compound (OV). It is, however, also possible, in addition, first to synthesize the silanes (S1) by means of a corresponding addition reaction, and only then to carry out the reaction with the compound (OV). It is preferred to synthesize the silanes (S1) in situ by means of a corresponding addition, while at the same time the reaction with the compound (OV) is carried out.

Functional groups of the silanes (S1) and/or the functional groups of the compound (OV) are preferably selected from the group consisting of hydroxyl, epoxy, isocyanate, carbamate, carboxyl, anhydride, amine, and thiol groups and/or ethylenically unsaturated double bonds.

It is preferred, furthermore, for the functional groups of the silanes and of the compound (OV) not both simultaneously to be ethylenically unsaturated double bonds, but instead for only one of the two groups to be an ethylenically unsaturated double bond.

Moreover, it is preferred in the coating compositions of the invention to employ adducts (A) which contain on average less than 50 mol % of free reactive groups other than the silane groups, more particularly than the alkoxysilane groups.

Examples of suitable addition reactions for preparing the adducts (A) with silane functionality therefore include more particularly
(I) reactions of isocyanate groups with hydroxyl groups, of isocyanate groups with amino groups, and of isocyanate groups with thiol groups;
(II) reactions of epoxy groups with carboxyl groups and of epoxy groups with anhydride groups;
(III) reactions of compounds containing active hydrogen atoms on ethylenically unsaturated double bonds (known as Michael additions), more particularly additions of amino groups with ethylenically unsaturated double bonds;
and
(IV) metal-catalyzed addition reactions.

Examples of reactions of group (I) include the following reactions:
additions of isocyanate-functional compounds with aminosilanes,
additions of isocyanate-functional compounds with thiol-functional silanes,
additions of isocyanatosilanes with hydroxy-functional compounds,
additions of isocyanatosilanes with amine-functional compounds, and
additions of isocyanatosilanes with thiol-functional compounds.

Inventively preferred is the nucleophilic addition of amine-functional silanes or thiol-functional silanes with isocyanate-functional oligomers.

Here and below an oligomer is a compound which has in general on average 2 to 10 basic structures or monomer units. A polymer, in contrast, is a compound which has in general on average more than 10 basic structures or monomer units.

Examples of reactions of group (II) include the following reactions:
additions of epoxy-functional silanes with carboxy-functional compounds,
additions of epoxy-functional silanes with anhydride-functional compounds, and
additions of anhydride-functional silanes with epoxy-functional compounds.

An exhaustive description of the addition reaction of the anhydride-functional silanes with epoxy-functional compounds is found in WO 2006/097387.

Examples of reactions of group (III) include the following reactions:
additions of aminosilanes with alpha,beta-unsaturated compounds, e.g., acryloyl- and methacryloyl-functional compounds, such as di(meth)acrylates, and the like.

Mention may be made here, by way of example, of group (IV), namely the metal-catalyzed addition reactions, of the hydrosilylation reaction. In the context of a hydrosilylation reaction of this kind it is possible, for example, for silanes with Si—H functionality to be reacted with (poly)olefins or with siloxanes containing C=C double bonds, such as diphenylsiloxane-dimethylsiloxane-vinyl-terminated copolymer, for example, which is available commercially from ABCR GmbH & Co. KG under article number AB 116641.

Other metal-catalyzed addition reactions as well, however, more particularly coupling reactions, can be employed.

Very generally it is possible as silanes (S1) to use compounds containing Si—H groups. These compounds can be reacted in a hydrosilylation reaction with the compounds (OV).

Mention may be made by way of example of silanes (S1) of this kind, containing Si—H groups, of trichlorosilane, methyldichlorosilane, and dimethylchlorosilane.

Compounds of this kind can be reacted with unsaturated compounds such as, for example, various 1,2 oligobutadienes or polybutadienes, or with siloxanes containing double bonds, such as under platinum catalysis, for example, to give the corresponding silane-functional resins. Where appropriate these silanes (S1) containing Si—H groups can be reacted in a reaction with suitable alcohols, such as methanol, to give the corresponding alkoxysilanes.

As well as the silanes containing Si—H bond it is particularly preferred to use organofunctional silanes (S1). Organofunctional silanes which can be used are silanes having one hydrolyzable radical, having two, or having three or more hydrolyzable radicals. With regard to the compatibility and the reactivity of the silanes, however, silanes having at least 3 hydrolyzable radicals are employed with preference.

Very generally the inventively preferred organofunctional silanes (S1) can be represented by the structural formula (IV)

(IV).

The groups X, which may be identical or different, are hydrolyzable groups.

The groups $R^S$ represent organic radicals having at least one functional group, more particularly linear and/or branched alkylene or cycloalkylene radicals having 1 to 20 carbon atoms and having at least one functional group, especially alkylene radicals having 1 to 4 carbon atoms and having at least one functional group;

R" is alkyl, cycloalkyl, aryl or aralkyl, the carbon chain possibly being interrupted by nonadjacent oxygen, sulfur or NRa groups, with Ra=alkyl, cycloalkyl, aryl or aralkyl, preferably R"=alkyl radical, more particularly having 1 to 6 C atoms.

In the structural formula, n=1 to 3, preferably 1 to 2, more preferably n=1, x=0 to 2, preferably 0 to 1, more preferably x=0, and $1 \leq n+x \leq 3$, preferably $1 \leq n+x \leq 2$, more preferably n+x=1.

The hydrolyzable groups X can be selected from the group of halogens, more particularly chlorine and bromine, from the group of alkoxy groups, from the group of alkylcarbonyl groups, and from the group of acyloxy groups. Alkoxy groups are particularly preferred.

The alkoxysilanes employed with particular preference can therefore be represented by the formula (V)

(V)

where n=1 to 3, preferably n=1 to 2, and more preferably n=1, x=0 to 2, preferably 0 to 1, more preferably x=0, and $1 \leq n+x \leq 3$, preferably $1 \leq n+x \leq 2$, more preferably n+x=1, and $R^S$ and R" are as defined for formula (IV).

The radical R may be hydrogen, alkyl or cycloalkyl, the carbon chain possibly being interrupted by nonadjacent oxygen, sulfur or NRa groups, with Ra=alkyl, cycloalkyl, aryl or aralkyl, preferably R=alkyl radical, more particularly having 1 to 6 C atoms.

The respective preferred alkoxy radicals may be alike or different; what is critical for the structure of the radicals, however, is to what extent they influence the reactivity of the hydrolyzable silane groups. Preferably R is an alkyl radical, more particularly having 1 to 6 C atoms. Particularly preferred are radicals R which raise the reactivity of the silane groups, i.e., which represent good leaving groups. Consequently a methoxy radical is preferred over an ethoxy radical, which in turn is preferred over a propoxy radical. With particular preference, therefore, R=ethyl and/or methyl, more particularly methyl. Very generally, however, less-reactive silanes than (S1) can also be employed. In these cases it is necessary to achieve a sufficient crosslinking density either by means of a correspondingly more efficient catalyst, or else a correspondingly higher amount of catalyst must be added.

Nonfunctional substituents on the organofunctional silane (S1), more particularly substituents on the radical $R^S$, may also influence its reactivity. This may be illustrated by way of example taking as an example bulky voluminous substituents on the amine function, which are able to reduce the reactivity of amine-functional silanes. Against this background, N-(n-butyl)-3-aminopropyltrimethoxysilane is preferred before N-cyclohexyl-3-aminopropyltrimethoxysilane.

Very generally, the radicals $R^S$ which raise the reactivity of the silanes are preferred over radicals which lower the reactivity of the silanes.

The reactivity of organofunctional silanes can also be significantly influenced, furthermore, through the length of the spacers or radicals $R^{S1}$ between silane functionality and organic functional groups. As examples of this, mention may be made of the "alpha" silanes, which are available from Wacker, and in which there is a methylene group, instead of the propylene group present in the case of "gamma" silanes, between Si atom and functional group. To illustrate this it is observed that methacryloyloxymethyltrimethoxysilane ("alpha" silane, e.g., commercial product GENIOSIL® XL 33 from Wacker) is used with preference over methacryloyloxypropyltrimethoxysilane ("gamma" silane, e.g., commercial product GENIOSIL® GF 31 from Wacker) for the synthesis of the adducts (A) of the invention.

Very generally, spacers which raise the reactivity of the silanes are preferred over spacers which lower the reactivity of the silanes.

In order to achieve as high as possible a crosslinking density through silane crosslinking it is advantageous to realize as many silane groups as possible in relation to the molecular weight of the adduct that is to be employed. If this has been ensured, and a particularly high network density results in the solid film, particularly good properties can be achieved in respect, among other things, of the scratch resistance. Against this background, very particular preference is given to those organofunctional silanes which allow a particularly high functionality to be realized in the resin with virtually no notable increase in molecular weight.

This may be shown by way of example taking as an example two amine-functional silanes: bis(3-trimethoxysilylpropyl)amine is preferred in front of N-(n-butyl)-3-aminopropyltrimethoxysilane.

The reactive groups of the silanes (S1) are preferably selected from the group consisting of amine, epoxy, anhydride, isocyanate, carbamate and/or thiol groups and/or ethylenically unsaturated double bonds.

Listed below by way of example—but without limitation—are inventively preferred organofunctional silanes which are particularly suitable for the preparation of the adducts (A):

1) Amine-functional and thiol-functional silanes.

Use is made, especially in the context of Michael additions, of, for example, primary aminosilanes, such as 3-aminopropyltriethoxysilane (available for example under the brand name Geniosil® GF 93 from Wacker Chemie), 3-aminopropyltrimethoxysilane (available for example under the brand name Geniosil® GF 96 from Wacker Chemie), N-(2-aminoethyl)-3-aminopropyltrimethoxysilane (available for example under the brand name Geniosil® GF 9 and also Geniosil® GF 91 from Wacker Chemie), N-(2-aminoethyl)-3-aminopropylmethyldimethoxysilane (available for example under the brand name Geniosil® GF 95 from Wacker Chemie) and the like.

Use is made, particularly in the context of additions to isocyanate-functional compounds, of, for example, secondary aminosilanes and mercapto-functional silanes, such as, for example, bis(2-tri-methoxysilylethyl)amine, bis(2-triethoxysilylethyl)amine, bis(3-triethoxy-silylpropyl)amine (available under the trade name Dynasylan® 1122 from Degussa), bis(3-trimethoxysilylpropyl)amine (available under the trade name Dynasylan® 1124 from Degussa), bis(4-triethoxysilyl-butyl)amine, N-(n-butyl)-3-aminopropyltrimethoxysilane (available under the trade name Dynasylan® 1189 from Degussa), N-(n-butyl)-3-aminopropyltriethoxysilane, N-cyclohexyl-3-aminopropyltrimethoxysilane (available under the brand name Geniosil® GF 92 from Wacker Chemie), N-cyclohexyl-3-aminopropyltriethoxysilane, 3-mercaptopropyl-trimethoxysilane (available from Degussa under the trade name Dynasylan® MTMO), 3-mercaptopropyltriethoxysilane, N-cyclo-hexylaminomethylmethyldiethoxysilane (available from Wacker Chemie under the trade name Geniosil® XL 924), N-cyclohexylaminomethyl-triethoxysilane (available from Wacker Chemie under the trade name Geniosil® XL 926), N-phenylaminomethyltrimethoxysilane (available from Wacker Chemie under the trade name Geniosil® XL 973), and the like.

2) Epoxy-functional silanes

Epoxy-functional silanes can be used in particular for addition to carboxylic acid-functional or anhydride-functional compounds. Examples of suitable epoxy-functional silanes are 3-glycidyloxypropyltrimethoxy-silane (available from Degussa under the trade name Dynasylan® GLYMO), 3-glycidyloxypropyltriethoxysilane (available from Degussa under the trade name Dynasylan® GLYEO), and the like.

3) Anhydride-functional silanes

Anhydride-functional silanes can be used in particular for addition to epoxy-functional compounds. An example that may be mentioned of a silane with anhydride functionality is 3-(triethoxysilyl)propylsuccinic anhydride (available from Wacker Chemie under the trade name Geniosil® GF 20).

4) Silanes with ethylenically unsaturated double bonds

Silanes of this kind can be used in the context of Michael reactions or else in the context of metal-catalyzed reactions. Those exemplified are 3-methacryloyloxypropyltrimethoxysilane (available for example from Degussa under the trade name Dynasilan® MEMO, or from Wacker Chemie under the trade name Geniosil® GF 31), 3-methacryloyloxypropyltriethoxysilane, vinyltrimethoxysilane (available from, among others, Wacker Chemie under the trade name Geniosil® XL 10), vinyl-dimethoxymethylsilane (available from, among others, Wacker Chemie under the trade name Geniosil® XL 12), vinyltriethoxysilane (available from, among others, Wacker Chemie under the trade name Geniosil® GF 56), (methacryloyloxymethyl)methyldimethoxysilane (available from, among others, Wacker Chemie under the trade name Geniosil® XL 32), methacryloyloxymethyltrimethoxysilane (available from, among others, Wacker Chemie under the trade name Geniosil® XL 33), (methacryloyloxymethyl)methyldiethoxysilane (available from, among others, Wacker Chemie under the trade name Geniosil® XL 34), and methacryloxymethyltriethoxysilane (available from, among others, Wacker Chemie under the trade name Geniosil® XL 36).

5) Silanes with isocyanate function or carbamate function

Silanes with isocyanate function or carbamate function are employed in particular in the context of reactions with hydroxyl-functional compounds. Examples of silanes with isocyanate function are, for example, described in the as yet unpublished American patent application bearing the Ser. No. 11/227,867.

Examples of suitable isocyanatoalkyltrialkoxysilanes are isocyanatopropyltrimethoxysilane, isocyanatopropylmethyldimethoxysilane, isocyanatopropylmethyldiethoxysilane, isocyanatopropyltriethoxysilane, isocyanatopropyltriisopropoxysilane, isocyanatopropylmethydiiso-propoxysilane; isocyanatoneohexyltrimethoxysilane, isocyanato-neohexyldimethoxysilane, isocyanatoneohexyldiethoxysilane, isocyanatoneohexyltriethoxysilane, isocyanatoneohexyltriisoprop-oxysilane, isocyanatoneohexyldiisopropoxysilane, isocyanatoisoamyl-trimethoxysilane, isocyanatoisoamylmethyldimethoxysilane, isocyanato-isoamylmethyldiethoxysilane, isocyanatoisoamyltriethoxysilane, iso-cyanatoisoamyltriisopropoxysilane, and isocyanatoisoamylmethyldiiso-propoxysilane. Many isocyanatoalkyltri- and -di-alkoxysilanes are available commercially, for example, under the designation SILQUEST® from OSi Specialties, Inc., a Witco Corporation company.

The isocyanatopropylalkoxysilane used preferably has a high degree of purity, more particularly a purity of at least 95%, and is preferably free from additives, such as transesterification catalysts, which can lead to unwanted side reactions.

Use is made in particular of (isocyanatomethyl)methyldimethoxysilane (available from Wacker Chemie under the brand name Geniosil® XL 42), 3-isocyanatopropyltrimethoxysilane (available from Wacker Chemie under the brand name Geniosil® XL 40) and N-dimethoxy(methyl)silyl-methyl O-methylcarbamate (available from Wacker Chemie under the brand name Geniosil® XL 65).

As silane component (S1) for reaction with the compound (OV) it is also possible, instead of or together with these monomeric silanes containing at least one functional group, to use adducts which have at least one functional group and at least one alkoxysilane group. These adducts with suitability as component (S1) are preparable by an addition reaction of the silanes having at least one, in particular more than one, functional group and a compound (V2) which contains at least one, preferably at least two, complementary functional group(s) (G2) which are reactive with functional groups of the silane. Use is made in particular of adducts of this kind as silane component (S1), in order to increase the alkoxy functionality without a substantial increase in molecular weight. Preferably, therefore, the compounds (V2) have a number-average molecular weight below 1000, more particularly below 500.

It is preferred to synthesize the adducts employed as silanes (S1) by means of a corresponding addition reaction in situ, while at the same time the reaction is carried out with the compound or compounds (OV). Suitable addition reactions are the addition reactions already mentioned above.

Besides this, however, it is also conceivable first to react the compound or compounds (OV) with a compound (V1) which contains at least one, preferably at least two, complementary functional group(s) which are reactive with the functional groups of the compound (OV). This reaction can take place before the reaction with the silane (S1). However, it is preferably carried out in situ, i.e., while the reaction with the silane (S1) is taking place at the same time. The compounds (V1) preferably have a number-average molecular weight below 1000, more particularly below 500.

One option for an in situ process of this kind encompasses the incomplete reaction of an isocyanate, more particularly of a diisocyanate or polyisocyanate, with one or more compounds (OV) which contain secondary amino groups or hydroxyl groups. The remaining isocyanate groups can then be reacted with suitable organofunctional silanes. It is preferred for this purpose to use silanes having secondary amine functions, although all other silanes that are reactive toward isocyanates can also be employed.

Components (D1) employed with particular preference in the coating compositions of the invention are obtainable by means of an in situ process which embraces the incomplete reaction of an isocyanate, more particularly a diisocyanate or polyisocyanate, with one of the abovementioned surface-active compounds containing secondary amine groups or hydroxyl groups. The remaining isocyanate groups can then be reacted with suitable organofunctional silanes. For this purpose it is preferred to use silanes containing secondary amine functions, although all other organofunctional silanes that are reactive toward isocyanates can also be employed.

Very particular preference is therefore given to the use as component (D1) of compounds which contain at least one reactive radical of the formula (VI):

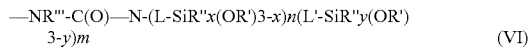

(VI)

where
R'''=hydrogen, alkyl, cycloalkyl, aryl or aralkyl, the carbon chain possibly being interrupted by nonadjacent oxygen, sulfur or NRa groups, with Ra=alkyl, cycloalkyl, aryl or aralkyl and
R'=hydrogen, alkyl or cycloalkyl, the carbon chain possibly being interrupted by nonadjacent oxygen, sulfur or NRa groups, with Ra=alkyl, cycloalkyl, aryl or aralkyl,
L, L'=linear and/or branched alkylene or cycloalkylene radical having 1 to 20 carbon atoms, more particularly alkylene radical having 1 to 4 carbon atoms, especially L, L'=$R^{S1}$ of the formulae (Si 1) or (Si 2),
R''=alkyl, cycloalkyl, aryl or aralkyl, the carbon chain possibly being interrupted by nonadjacent oxygen, sulfur or NRa groups,
n=0 to 2, m=0 to 2, m+n=2,
and
x,y=0 to 2.

These preferred components (D1) of the invention, containing at least one reactive radical of the formula (VI), have preferably been prepared by reaction of
at least one di- and/or polyisocyanate (PI) with
at least one aminosilane of the formula (VII)

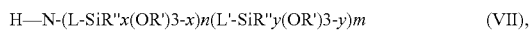

(VII), where the substituents R', L, L', and R'' and the indices n, m, x, and y are as defined for the formula (VI),
and
at least one surface-active compound (OV).

Particularly preferred aminosilanes (VII) are bis(2-ethyltrimethoxysilyl)-amine, bis(3-propyltrimethoxysilyl)amine, bis(4-butyltrimethoxy-silyl)amine, bis(2-ethyltriethoxysilyl)amine, bis(3-propyltriethoxysilyl)-amine and/or bis(4-butyltriethoxysilyl)amine. Bis(3-propyltrimethoxysilyl)-amine is especially preferred. Aminosilanes of this kind are available for example under the brand name DYNASILAN® 1124 from DEGUSSA or Silquest® from OSI Specialties Inc.

Suitable di- and/or polyisocyanates (PI) for the preparation of this component (D1) are substituted or unsubstituted aromatic, aliphatic, cycloaliphatic and/or heterocyclic di- and/or polyisocyanates that are known per se. Examples of preferred di- and/or polyisocyanates include the following: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetra methylene 1,4-diisocyanate, hexamethylene 1,6-diisocyanate, 2,2,4-trimethylhexane 1,6-diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, 2,4- or 2,6-diisocyanato 1-methyl-cyclohexane, diisocyanates derived from dimer fatty acids, of the kind sold under the commercial designation DDI 1410 by Henkel, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl isocyanates (e.g., TMXDI® from American Cyanamid), and mixtures of the aforementioned polyisocyanates. Preferred polyisocyanates, furthermore, are the biuret dimers and the isocyanurate trimers of the aforementioned diisocyanates.

Particularly preferred polyisocyanates (PI) are hexamethylene 1,6-diisocyanate, isophorone diisocyanate, and 4,4'-methylenedicyclohexyl diisocyanate, their biuret dimers and/or isocyanurate trimers.

In another embodiment of the invention the polyisocyanates (PI) are polyisocyanate prepolymers with urethane structural units, which are obtained by reacting polyols with a stoichiometric excess of aforementioned polyisocyanates. Polyisocyanate prepolymers of this kind are described for example in U.S. Pat. No. 4,598,131.

Especially preferred components (D1) are reaction products of hexamethylene 1,6-diisocyanate and isophorone diisocyanate, and/or their isocyanurate trimers, with bis(3-propyltrimethoxysilyl)amine and at least one hydroxyl-containing polysiloxane of the abovementioned formula (III) as surface-active compound (OV).

The reaction of the polyisocyanates with the aminosilanes takes place preferably in an inert gas atmosphere at temperatures of not more than 100° C., preferably of not more than 60° C.

In the reaction of the di- and/or polyisocyanates with the aminosilanes (VII), preferably at least 50 mol %, more preferably at least 70 mol %, and not more than 98 mol %, in particular not more than 99 mol %, of the isocyanate groups of the di- and/or polyisocyanate (PI) have undergone reaction to form structural units (VI). The remaining isocyanate groups are then reacted with suitable surface-active compounds (OV). It is also possible, however, first to react some of the di- and/or polyisocyanate with suitable surface-active compounds (OV) and subsequently to perform the reaction with the aminosilanes. Also possible, finally, is the simultaneous reaction of all the compounds with one another (in situ process).

The amounts of the di- and/or polyisocyanates and of the aminosilanes (VII) and of the surface-active compound (OV) are preferably selected such that component (D1) contains on average less than 50 mol % of free isocyanate groups.

The surface-active compound (OV) is employed typically in an amount of 0.05% to 50% by weight, preferably in an amount of 0.1% to 10% by weight, based in each case on the amount of component (D1) employed, without solvent.

Component (D1) is typically employed in amounts sufficient to exert targeted control over the properties of the at least partly crosslinked coating. The fraction of component (D1) as a proportion of the coating composition of the invention is preferably from 0.1% to 35% by weight, more preferably from 0.5% to 15% by weight, very preferably from 1% to 10% by weight, based in each case on the nonvolatiles content of the coating composition.

Crosslinkable Component (D2)

As crosslinkable component (D2) it is possible, for example, to use all film-forming materials which are typically employed in coating compositions. As a result of the addition of the specific surface-active component (D1), these coating compositions are modified in such a way that the surface properties of the resulting coating can be set in the targeted way already described.

As component (D2) it is possible to use compounds which are able to form nodes with the crosslinkable groups of the component (D1) and/or with themselves, where appropriate under catalysis, and/or with a crosslinking agent (VM).

When selecting the crosslinkable component (D2) it should preferably be ensured that, when the coating compositions are cured, hydrolysis-labile Si—N—C and/or Si—O—C nodes are formed only to a very minor extent, or not at all.

As component (D2), therefore, it is possible to employ oligo- and/or polyurethane (meth)acrylates, polyester (meth)acrylates, epoxy (meth)acrylates, (meth)acryloyl-functional (meth)acrylic copolymers, polyether (meth)acrylates, unsaturated polyesters, amino (meth)acrylates, melamine (meth)acrylates and/or silicone (meth)acrylates containing one or more double bonds, preferably polyurethane (meth)acrylates and/or polyester (meth)acrylates, which in addition to the double bonds may where appropriate also have carbamate, biuret, allophanate, amide, urea, hydroxyl, carboxyl and/or epoxide groups.

The urethane (meth)acrylates can be prepared in a manner known to the skilled worker from di- and/or polyisocyanates, from at least one compound containing groups that are reactive toward isocyanate groups, and from at least one compound which contains groups that are reactive toward isocyanate groups and also contains at least one ethylenically unsaturated group, preparation taking place by mixing of the components in any order, where appropriate at an elevated temperature.

In particular the urethane (meth)acrylates are obtained by initially introducing the di- or polyisocyanate and then adding at least one hydroxyalkyl (meth)acrylate or hydroxyalkyl ester of other ethylenically unsaturated carboxylic acids, as a result of which some of the isocyanate groups are reacted to start with. Subsequently a chain extender from the group of the diols/polyols and/or diamines/polyamines and/or dithiols/polythiols and/or alkanolamines is added, and in that way the remaining isocyanate groups are reacted with the chain extender.

The polyester (meth)acrylates that are suitable in addition to the urethane (meth)acrylates are known in principle to the skilled worker. They can be prepared by a variety of methods. For example, acrylic and/or methacrylic acid can be used directly as an acid component when synthesizing the polyesters. Another possibility is to use hydroxyalkyl esters of (meth)acrylic acid as an alcohol component directly when synthesizing the polyesters. Preferably, however, the polyester (meth)acrylates are prepared by acrylation of polyesters. By way of example it is possible first to synthesize hydroxyl-containing polyesters, which are then reacted with acrylic or methacrylic acid. It is also possible first to synthesize carboxyl-containing polyesters, which are then reacted with a hydroxyalkyl ester of acrylic or methacrylic acid. Unreacted (meth)acrylic acid can be removed from the reaction mixture by washing, by distillation or, preferably, by reaction with an equivalent amount of a monoepoxide or diepoxide compound, using suitable catalysts, such as triphenylphosphine, for example. For further details of the preparation of the polyester acrylates reference may be made in particular to DE-A 33 16 593 and DE-A 38 36 370 and also to EP-A-54 105, DE-B 20 03 579, and EP-B-2866.

The polyether (meth)acrylates that are also suitable are likewise known in principle to the skilled worker. They can be prepared by a variety of methods. For example, hydroxyl-containing polyethers which are esterified with acrylic acid and/or methacrylic acid can be obtained by reacting dihydric and/or polyhydric alcohols with different amounts of ethylene oxide and/or propylene oxide in accordance with well-known methods (cf., e.g., Houben-Weyl, volume XIV, 2, Makromolekulare Stoffe [Macromolecular compounds] II, (1963)). It is also possible to use polymerization products of tetrahydrofuran or of butylene oxide.

Furthermore, epoxy (meth)acrylates as well are well known to the skilled worker and therefore require no detailed elucidation. They are typically prepared by addition reaction of acrylic acid with epoxy resins, for example with epoxy resins based on bisphenol A, or other commercially customary epoxy resins.

In particular the crosslinkable component (D2) is composed of one or more binders (BM) and, where appropriate, of one or more crosslinking agents (VM) as well.

The binders (BM) are preferably selected from the group of oligomeric and/or polymeric compounds which contain radiation-crosslinkable groups, more particularly ethylenically unsaturated groups, such as acrylate and/or methacrylate groups, and/or thermally crosslinkable groups, such as hydroxyl groups, carbamate groups, epoxy groups, isocyanate groups, carboxyl and/or anhydride groups, preferably hydroxyl groups and/or carbamate groups and/or acrylate and/or methacrylate groups, and/or the crosslinking agents (VM) are selected from the group consisting of amino resins, nonblocked di- and/or polyisocyanates, blocked di- and/or polyisocyanates, polyepoxides, polycarboxylic acids, polyanhydrides, and polyols.

Use is made in particular of binders (BM) based on polyurethanes and/or poly(meth)acrylates and/or polyesters which contain thermally curable groups, more particularly hydroxyl and/or carbamate groups.

The binders typically have number-average molecular weights, determined by gel permeation chromatography against polystyrene standards, of 500 to 20 000, more particularly of 500 to 4000.

The OH number of the OH-containing binders is preferably between 50 and 500 mg KOH/g, more particularly between 70 and 250 mg KOH/g, determined in each case in accordance with DIN EN ISO 4629, 07.1998 edition.

Binders containing carbamate groups typically have an arithmetic carbamate equivalent weight, CEW, of 250 to 700 g/equivalent, more particularly of 250 to 500 g/equivalent.

As binders (BM) use is made, for example, of (meth)acrylate copolymers obtainable by copolymerizing (a1) 10% to 80% by weight, preferably 20% to 60% by weight, of 3-hydroxypropyl acrylate or 3-hydroxypropyl methacrylate or 2-hydroxypropyl acrylate or 2-hydroxypropyl methacrylate or 2-hydroxyethyl acrylate or 2-hydroxyethyl methacrylate or 4-hydroxy-n-butyl acrylate or 4-hydroxy-n-butylmethacrylate or mixtures of these monomers, (b1) 0% to 30% by weight, preferably 0% to 15% by weight, of a non-(a1) hydroxyl-containing ester of acrylic acid or of a hydroxyl-containing ester of methacrylic acid or of a mixture of such monomers, (c1) 0% to 90% by weight, preferably 10% to 70% by weight, of a non-(a1) and non-(b1) aliphatic or cycloaliphatic ester of (meth)acrylic acid having at least 4 carbon atoms in the alcohol residue, or of a mixture of such monomers, (d1) 0% to 3% by weight, preferably 0% to 2% by weight, of an ethylenically unsaturated carboxylic acid or of a mixture of ethylenically unsaturated carboxylic acids, and (e1) 0% to 50% by weight, preferably 0% to 35% by weight, of a vinyl-aromatic compound and/or of a non-(a1), non-(b1), non-(c1), and non-(d1) ethylenically unsaturated monomer or of a mixture of such monomers, the sum of the weight fractions of components (a1), (b1), (c1), (d1), and (e1) always making 100% by weight.

The crosslinking agents (VM) are selected in particular from the group consisting of amino resins, nonblocked polyisocyanates, blocked polyisocyanates, polyepoxides, polycarboxylic acids, polyanhydrides, and polyols.

Suitable amino resins are the typical and known amino resins some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207.

Other suitable crosslinking agents (VM) are epoxy resins, which preferably react with themselves under the catalysis of component (C), particular preference being given to aliphatic epoxy resins which exhibit a high weathering stability. Epoxy resins of this kind are described in, for example, the monograph by B. Ellis "Chemistry and Technology of Epoxy Resins" (Blackie Academic & Professional, 1993, pages 1 to 35).

As crosslinking agents (VM) it is preferred to use di- and/or polyisocyanates. Examples of suitable di- and/or polyisocyanates are the di- and/or polyisocyanates already described above in connection with component (D1). Preference is given to using aliphatic and/or cycloaliphatic di- and/or polyisocyanates.

When the isocyanates are used in 1K (one-component) coating materials, the isocyanates are reacted, in a manner known to the skilled worker, with a blocking agent, the selection of the blocking agent being guided in particular by the desired curing temperature, as the skilled worker is aware.

Generally speaking, component (D2) is employed in fractions of 50% to 99.8% by weight, preferably of 80% to 99.4% by weight, more preferably of 85% to 98.5% by weight, based on the nonvolatiles of the coating composition.

The binders (BM) are employed typically in fractions of 1% to 70%, preferably of 10% to 50%, more preferably of 20% up to 45% by weight, based on the nonvolatiles of the coating composition.

The crosslinking agents (VM) are employed typically in fractions of 1% to 70%, preferably of 10% to 60%, more preferably of 25% up to 55% by weight, based on the nonvolatiles of the coating composition.

Further Constituents of the Coating Composition (B)

The coating compositions (B) preferably further comprise one or more catalysts (C) for the crosslinking of the reactive groups of component (D1), more particularly for the crosslinking of the silane groups.

As catalysts (C) for the crosslinking of the silane groups or of the alkoxysilane groups it is possible in principle to employ compounds which are known per se. Examples are Lewis acids (electron deficiency compounds), such as tin naphthenate, tin benzoate, tin octoate, tin butyrate, dibutyltin dilaurate, dibutyltin diacetate, dibutyltin oxide, and lead octoate, for example. There are concerns about the toxicity of these compounds, though. In particular, when effective amounts for silane crosslinking are to be used, catalysts of this kind display a tendency toward yellowing, particularly on overtaking, i.e., on crosslinking at a relatively high temperature, at 160° C., for example. Stability to such overtaking, however, is a prerequisite for the use of OEM clearcoats in line production. Other, less toxicologically objectionable catalysts are metal complexes with chelate ligands, based on aluminum or else on zinc, examples being the catalysts described in WO-A-2006/042585, page 10 lines 4 to 21. These catalysts also display a tendency toward severe yellowing on overtake, and ought therefore as far as possible not to be used in the formulations of the invention.

As far as the toxicological properties and yellowing in overbake tests are concerned, the invention prefers catalysts based on derivatives of phosphorus acids.

As catalyst (C) use is therefore made in particular of substituted phosphonic diesters and diphosphonic diesters, preferably from the group consisting of acyclic phosphonic diesters, cyclic phosphonic diesters, acyclic diphosphonic diesters, and cyclic disphosphonic diesters, and also substituted phosphoric monoesters and phosphoric diesters, preferably from the group consisting of acyclic phosphoric diesters and cyclic phosphoric diesters, or the corresponding amine-blocked esters. Suitable phosphorus catalysts are described in, for example, the as yet unpublished German patent application DE P102005045228.0-44.

As catalyst (C) it is preferred to employ correspondingly substituted phosphoric monoesters and phosphoric diesters, preferably from the group consisting of acyclic phosphoric diesters and cyclic phosphoric diesters.

The acyclic phosphonic diesters (C) here are selected in particular from the group consisting of acyclic phosphonic diesters (C) of the general formula (VIII):

 (VIII)

where the radicals $R^{10}$ and $R^{11}$ are alike or different from one another; preferably they are alike.

The radicals $R^{10}$ and $R^{11}$ are selected from the group consisting of:
  substituted and unsubstituted alkyl having 1 to 20, preferably 2 to 16, and more particularly 2 to 10 carbon atoms, cycloalkyl having 3 to 20, preferably 3 to 16 and more particularly 3 to 10 carbon atoms, and aryl having 5 to 20, preferably 6 to 14, and more particularly 6 to 10 carbon atoms,
  substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups they contain each containing the aforementioned number of carbon atoms, and
  substituted and unsubstituted radical of the aforementioned kind containing at least one, more particularly one, heteroatom selected from the group consisting of oxygen atom, sulfur atom, nitrogen atom, phosphorus atom, and silicon atom, more particularly oxygen atom, sulfur atom, and nitrogen atom.

Preference is given to using the acyclic phosphonic diesters (C) of the general formula (VIII), more particularly those in which the radicals $R^{10}$ and $R^{11}$ of the general formula (VIII) are selected from the group consisting of phenyl, methyl, and ethyl. One example of a highly suitable phosphonic diester (C) of the general formula (VIII) is diphenyl phosphonate, which is sometimes also referred to by those in the art (not entirely correctly) as diphenyl phosphite.

Employed with particular preference as catalyst (C) are correspondingly substituted phosphoric monoesters and phosphoric diesters, preferably from the group consisting of acyclic phosphoric diesters and cyclic phosphoric diesters.

These acyclic phosphoric monoesters and diesters (C) are selected more particularly from the group consisting of acyclic phosphoric monoesters and diesters (C) of the general formula (IX):

where $R^{10}$ and $R^{11}$ are as defined above and in addition may also represent hydrogen (partial esterification).

Examples of especially suitable phosphoric esters (C) are the corresponding amine-blocked phosphoric esters, more particularly amine-blocked ethylhexyl phosphate and amine-blocked phenyl phosphate.

As far as the amine is concerned that is used to block the phosphoric esters, particular preference is given to triethylamine. Certain amine-blocked phosphoric acid catalysts are also available commerically. As an example, mention may be made of the substance sold under the designation Nacure 4167 by King Industries as a particularly suitable catalyst based on an amine-blocked partial ester of phosphoric acid.

Catalyst (C) is typically employed in fractions of 0.1% to 15% by weight, preferably of 0.5% to 5% by weight, based on the nonvolatiles of the coating composition.

The coating compositions further typically comprise solvents (L). Particularly suitable solvents are aprotic solvents which within the coating composition are chemically inert toward the other components and which also do not react when the coating composition is cured. Examples of this kind of solvent are aliphatic and/or aromatic hydrocarbons such as toluene, xylene, Solventnaphtha®, Solvesso 100 or Hydrosol® (ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1% by weight, more preferably not more than 0.5% by weight, based on the solvent.

The coating compositions of the invention may further comprise typical auxiliaries and additives, such as catalysts for crosslinking components (D1) and (D2), defoamers, adhesion promoters, additives for enhancing substrate wetting, additives for enhancing surface smoothness, matting agents, light stabilizers, preferably UV absorbers and/or HALS, corrosion inhibitors, biocides, flame retardants or polymerization inhibitors, for example, as described in detail in the book "Lackadditive" [Additives for Coatings] by Johan Bieleman, Wiley-VCH, Weinheim, N.Y., 1998, in typical amounts, more particularly in amounts of up to 5% by weight, based on the total weight of the coating composition.

Particularly preferred coating compositions are obtained when the amount of other, noncrosslinking surface-active substances, i.e., of surface-active substances with the exception of component (D1), is kept as low as possible. More particularly the amount of these other, noncrosslinking surface-active substances is below 0.5% by weight and more preferably below 0.1% by weight, based in each case on the total weight of the coating composition. Examples of such other, noncrosslinking surface-active substances are, in particular, typical flow control additives and the like.

Multicoat Effect and/or Color Paint Systems

The coating compositions of the invention are outstandingly suitable as decorative, protective and/or effect-imparting, highly scratchproof coatings and paint systems, more particularly as the transparent coating of a multicoat effect and/or color paint system, on bodies of means of transport or parts thereof (more particularly motor vehicles, such as motorcycles, buses or automobiles, commercial vehicles, such as agricultural machinery and trucks, and also in aircraft construction and shipbuilding, and for interior and exterior bodywork components) in the OEM and refinish segments; on buildings, both interior and exterior; on furniture, windows, and doors; on plastics moldings, more particularly CDs and window; on small industrial parts, on coils, containers, and packaging; on white goods; on films; on optical, electrical, and mechanical components; and on hollow glassware and articles of everyday use.

The coating compositions and paint systems of the invention, more particularly the clearcoats, are employed in particular in the technologically and esthetically particularly demanding field of automotive OEM finishing. With particular preference the coating compositions of the invention are used in multistage coating methods, particularly in methods where at least one pigmented coating composition is applied to a precoated or unprecoated substrate and thereafter a transparent coating composition is applied to at least part of the resulting pigmented coating, and cured, the transparent coating being produced from the coating compositions of the invention.

This method is employed in particular in automotive OEM finishing and/or commercial vehicle finishing and/or refinish, for the coating of interior or exterior bodywork components or of components for shipbuilding or aircraft construction, or of components for household and electrical appliances, or of plastics moldings or films.

Preference is also given, accordingly, to multicoat paint systems composed of at least one pigmented coating and, atop it, a transparent coating, the transparent coating having been produced from the coating composition of the invention.

The pigmented coatings employed in this case may have been produced using either aqueous or solventborne pigmented coating compositions, which in general are curable physically or thermally and/or with actinic radiation.

The pigmented coating compositions typically comprise
(I) one or more solvents and/or water,
(II) one or more binders, preferably one or more polyurethane resins and/or acrylate resins and/or polyester resins, more preferably at least one polyurethane resin,
(III) if desired, at least one crosslinking agent,
(IV) one or more pigments, especially effect pigments and/or color pigments, and
(V) if desired, one or more typical auxiliaries and additives.

Suitable binders here are the polyurethane resins, acrylate resins, and polyester resins that are typically employed in basecoats in the automotive industry segment, the properties and hence the suitability of the binders for the method of the invention being directed, in a manner known to the skilled worker, via the selection of the nature and amount of the synthesis components used for preparing these binders.

Preference is given to using polyurethane resins, where appropriate in combination with one or more polyacrylate resins and/or with one or more polyester resins.

Suitable pigmented coating compositions (basecoat materials) are described in, for example, EP-A-0 692 007 and in the documents it cites at column 3 lines 50 et seq.

The coating compositions of the invention can be applied by any customary application method, such as spraying, knifecoating, spreading, pouring, dipping, impregnating, trickling or rolling, for example. The substrate to be coated may itself be at rest, with the application equipment or unit being moved. Alternatively the substrate to be coated, more particularly a coil, may be moved, with the application unit being stationary relative to the substrate or being moved in an appropriate way. Preference is given to employing spray application methods, such as compressed-air spraying, airless spraying, high-speed rotation or electrostatic spray application (ESTA), for example, where appropriate in conjunction with hot spray application such as hot-air spraying, for example.

Curing of the applied coating compositions of the invention may take place after a certain rest time. This rest time serves, for example, for the leveling and degassing of the coating films or for the evaporation of volatile constituents such as solvents. The rest time may be shortened and/or assisted through the application of elevated temperatures and/or through a reduced humidity, provided this is not accompanied by any damage to or change in the coating films, such as premature complete crosslinking, for instance.

In the case of radiation-curable film-forming materials, curing takes place, in a manner known to the skilled worker, by means of radiation, more particularly by means of UV radiation. It is preferred to use a radiation dose of 100 to 6000, preferably 200 to 3000, more preferably 300 to 2500, and with particular preference 500 to 2000 mJ cm$^{-2}$. Irradiation may be carried out under an oxygen-depleted atmosphere. "Oxygen-depleted" means that the oxygen content of the atmosphere is lower than the oxygen content of air (20.95% by volume). In principle the atmosphere may also be oxygen-free, i.e., it may comprise an inert gas. On account of the absence of the inhibiting effect of oxygen, however, this may result in a sharp acceleration to the radiation cure, possibly leading to inhomogeneities and stresses. It is therefore advantageous not to lower the oxygen content of the atmosphere to zero % by volume.

There are no peculiarities in terms of method to the thermal curing of the coating compositions, which instead takes place in accordance with the typical, known methods, such as heating in a forced-air oven or irradiation using IR lamps. This thermal curing may also take place in stages. Another preferred curing method is that of curing with near infrared (NIR) radiation. The thermal curing takes place advantageously at a temperature of 50 to 200° C., more preferably 60 to 190° C., and in particular 80 to 180° C., for a time of 1 min up to 5 h, more preferably 2 min up to 2 h, and in particular 3 min to 90 min.

The coating compositions of the invention yield new cured coatings, especially surface coatings, more particularly clearcoats, moldings, more particularly optical moldings, and self-supporting films, all of which are highly scratchproof and in particular are stable to chemicals and to weathering. In particular the coatings and surface coatings of the invention, more particularly the clearcoats, can be produced even in film thicknesses>40 μm without the occurrence of stress cracks.

Method of Controlling the Properties of a Coating

Also provided in accordance with the invention, furthermore, is a method of controlling the properties of at least partly crosslinked coatings (K), wherein the coating (K) is composed of a near-surface coating zone (K1) and a volume coating zone (K2), and the coating (K) is produced from a coating composition which comprises at least two different crosslinkable components (D1) and (D2), at least part of component (D1) having one or more surface-active structural units (O); wherein (i) the crosslinking density of the network (N1) formed from component (D1) is higher than the crosslinking density of the network (N2) formed from component (D2), and (ii) the properties of the coating are controlled by way of the ratio of the crosslinking density of the network (N1) formed from component (D1) to the crosslinking density of the network (N2) formed from component (D2).

As already observed above, the near-surface coating zone (K1) is formed substantially by the at least partly crosslinked component (D1) and the volume coating zone (K2) is formed substantially by the at least partly crosslinked component (D2).

Determining the Properties of the Coating (K)

The cured coatings of the invention, especially surface coatings, more particularly clearcoats, are highly scratch-proof and in particular are stable to chemicals and to weathering. In particular it is possible to produce the coatings and surface coatings of the invention, more particularly the clearcoats, even in film thicknesses>40 μm, without stress cracks occurring.

Thus the cured coatings of the invention, and preferably the corresponding transparent coatings of a multicoat color and/or effect paint system, are notable for very good micropenetration hardness. These cured coatings preferably have a micropenetration hardness of at least 90 N/mm$^2$, more particularly of at least 100 N/mm$^2$, and with very particular preference of at least 110 N/mm$^2$. This micropenetration hardness is measured on coatings which have a dry film thickness of 40 μm and which have been dried at 140° C. for 22 minutes and stored at 25° C. for 5 days before the micropenetration hardness is measured. The micropenetration hardness was determined in accordance with DIN EN ISO 14577 with the aid of the Fischerscope instrument from Fischer, with a maximum force of 25.6 mN.

The cured coatings of the invention are notable in particular for improved dry scratch resistance. The dry scratch resistance was determined using the crockmeter test (9 μm paper grade). This was done by operating along the lines of EN ISO 105-X 12 and evaluating the loss of gloss at 20° after 10 double rubs. The coating compositions of the invention are also suitable for scratchproofing exposed areas on painted automobile bodies.

The chemical surface properties, and especially the gradient of the chemical disuniformity, are determined via photoelectron spectroscopy (XPS), the information depth, for detection of the gradient, being varied via exit angle variation or sputter depth profile analysis, and with the aid of transmission electron microscopy together with EDX (energy dispersive X-ray spectroscopy).

All the XPS measurements were carried out on a small-spot spectrometer from Physical Electronics, with the model identification PHI 5600 LS. The X-rays were always generated using the Mg tube (1253.6 keV). The detection of the photoelectrons, with a pass energy of 23.5 eV, used the following bond levels to determine the atomic concentrations: for Si, the 2p level, for O, the 1s level, and for C as well the 1s level. By varying the angle of detection of the photoelectrons—that is, the angle between the sample surface and the axis of the electronic lenses in front of the electron spectrometer—the depth at which the measurement signals are generated (information depth) was changed: at 5° the information depth is about 1.2 nm (XPS(Si) 1.2 nm), at 45° about 10 nm (XPS(Si) 10 nm). At the detection angle of 45° the measurement area has a diameter of 800 μm; at 5° it has undergone corresponding elliptic enlargement. Following preparation of thin sections with a microtome, parallel to the surface and approximately 10 μm below the surface, a reference value can be obtained at a comparative depth in material (XPS(Si) 10 μm).

The following nomenclature is used additionally to characterize the results of the photoelectron spectroscopy:

XPS(Si) 1.2 nm stands for the fraction of the detected atoms (in this case silicon) measured from an information depth of 1.2 nm from the surface of the coating material. The totality of the atomic species detectable by XPS at the stated information depth is reported as 100%. As the skilled worker is aware, hydrogen, for example, cannot be detected by XPS.

The thin sections were prepared starting from steel panels with a corresponding complete system. The microtome sections were prepared using a motorized commercial rotary microtome of type RM 2155, available from Leica Mikrosysteme, Bensheim. Prior to sectioning, the desired thickness was first set. Subsequently the respective metal panels were fixed. In the actual operational step, the rotary microtome was run over the respective metal panels. The resulting thin sections were employed for the further investigations.

The physicomechanical properties can also be determined with local and depth resolution by means of nanoindentation, using for example the TriboIndenter® nanoindentation instrument from Hysitron Inc. The experimental implementation of this test takes place as follows: the impression body used is a three-sided diamond pyramid in Berkovich geometry (opening angle 142.3°) with an extremely pointed tip (radius<100 nm). This body is then pressed for 10 s into the surface of the coating, with a force increasing linearly up to a maximum of 5 mN, the penetration depth being between 1 μm and 1.5 μm, is held there for a further 30 s under maximum force, and over the next 10 s is withdrawn from the surface with a linearly falling force. From the resulting dataset of force versus depth of penetration, the known algorithm of *Oliver and Pharr* (cf. W. C. Oliver, G. M. Pharr, Journal of Materials Research. 7 (1992), 1565, G. M. Pharr, Materials Science and Engineering A 253 (1998), 151) is used to determine the mechanical data of the analyzed material with local resolution.

EXAMPLES 1.1. Preparation of an Adduct (AV1)

A reaction vessel equipped with stirrer, reflux condenser, oil heating, and nitrogen inlet tube was charged with 456.38 parts by weight of a commercial isocyanurate of hexamethylene diisocyanate (Desmodur N 3600 from Bayer AG). Added slowly to this initial solution of the isocyanurate, with stirring, were 815.62 parts by weight of N,N-bis(3-trimethoxysilylpropan-1-yl)amine (Dynasylan® 1124 from Degussa). This was followed by stirring at 55° C. for a further two hours. Thereafter free isocyanate groups were no longer detectable by IR spectroscopy. The resulting compound (AV1) had a solids content of 79%.

1.2. Preparation of a Surface-Modified Adduct (A1)

A reaction vessel equipped with stirrer, reflux condenser, oil heating, and nitrogen inlet tube was charged with 100 parts by weight of a commercial isocyanurate of hexamethylene diisocyanate (Desmodur N 3600 from Bayer AG). Added slowly to this initial solution of the isocyanurate, with stirring, was a solution of 15 parts by weight of a carbinol-functional siloxane (Baysilone® OF 502 6% from GE-Bayer Silicones) in 3.75 parts by weight of the commercial aromatic solvent Solventnaphta®. Following the addition, the reaction mixture was heated to 55° C. and stirred at 55° C. for a further 2 hours. Next, slowly and with stirring, 172.5 parts by weight of N,N-bis(3-trimethoxysilylpropan-1-yl)amine (Dynasylan® 1124 from Degussa) were added to the mixture. Stirring was then carried out at 55° C. for a further two hours. Thereafter free isocyanate groups were no longer detectable by IR spectroscopy. The resulting compound (A1) had a solids content of 80.8%. The surface tension of the reactants employed and of the adduct A1 was determined by means of the ring method. The results obtained are compiled in the table below:

| Substance | Surface tension σ/[mN/m] |
|---|---|
| N,N-Bis(3-trimethoxysilylpropan-1-yl)amine (Dynasylan® 1124) | 30.3 |
| Baysilone® OF 502 6% (GE Bayer Silicones) | 21.7 |
| Desmodur N 3600 (Bayer AG) | 43.2 |
| Adduct A1 | 26.5 |

1.3. Preparation of a Catalyst (C1) Based on an Amine-Blocked Phosphoric Ester

A reactor equipped with a dropping funnel and a reflux condenser was charged with 43.2 parts by weight of phenyl phosphate and 39.2 parts by weight of methoxypropyl acetate and this initial charge was homogenized. Subsequently, with cooling and stirring, 17.6 parts by weight of triethylamine were added dropwise at a rate such that the temperature did not exceed 60° C. Following addition of the triethylamine, the reaction mixture was stirred at room temperature for 2 hours more. The resulting reaction product had a solids content of 50.0%.

1.4. Preparation of a Hydroxyl-Containing Polyacrylate (PAC 1)

A reactor flushed with nitrogen and with a condenser attached was charged with 30.4 parts by weight of Solventnaphta®, and this initial charge was heated to 140° C. with stirring. In parallel with this, two separate feed streams were prepared. Feed stream 1 consisted of 13.9 parts by weight of styrene, 26.7 parts by weight of butyl acrylate, 15.0 parts by weight of hydroxyethyl acrylate, and 1.4 parts by weight of acrylic acid. Feed stream 2 consisted of 5.9 parts by weight of Solventnaphta® and 1.30 parts by weight of peroxide DTBP (=di-tert-butyl peroxide). When the temperature of 140° C. had been reached, feed stream 2 was metered in slowly and uniformly over a period of 285 minutes. 15 minutes after the start of feed stream 2, feed stream 1 was metered slowly and uniformly into the reactor over a period of 240 minutes. After the end of the metering of feed stream 2, the reaction mixture was stirred at 140° C. for a further 120 minutes for postpolymerization. The solids content of the resulting product was found to be 60%, the acid number 19 mg KOH/g and the OH number 128 mg KOH/g (in each case based on the solids) and the viscosity 9.5 dPas at 23° C.

1.5. Preparation of an Acrylate-Based Rheological Assistant

A methacrylate copolymer is prepared in 32.02 parts by weight of Solventnaphta® from 25.67 parts by weight of styrene, 22.30 parts by weight of n-butyl acrylate, 13.87 parts by weight of 2-hydroxyethyl acrylate, 1.41 parts by weight of ethacrylic acid, and 0.870 part by weight of lauryl methacrylate (MA-13, available from Degussa).

84.7 parts by weight of the resulting methacrylate copolymer, 5.88 parts by weight of butyl acetate, 2.24 parts by weight of benzylamine, and 1.76 parts by weight of hexamethylene diisocyanate, in solution in 3.42 parts by weight of butyl acetate, are used to prepare a urea-modified, acrylate-based rheological assistant which had a solids of 59%.

2. Preparation of the 1-Component (1K) Clearcoat Materials 1 to 6

The raw materials set out in Table 1 were combined in succession in the quantities indicated, and homogenized, in order to prepare the 1K clearcoat materials.

initial drying at 80° C. for 10 minutes. The basecoat film and the clearcoat film were cured together at 140° C. for 22 minutes. The resulting basecoat had a film thickness of 7.5 µm, and the clearcoat a film thickness of 40 µm.

4. Investigation of the Properties of the Resulting Coatings

All of the surfaces were of high gloss and outstanding appearance. The dry scratch resistance of the resulting surfaces was determined by means of the crockmeter test (9 µm paper grade). This was done by operating along the lines of EN ISO 105-X 12 and evaluating the loss of gloss at 20° C.

TABLE 1

Composition of the 1K clearcoat materials of comparative examples C1, C2, C3, and C4, and also of inventive examples 1 and 2

| Ingredient [parts by weight] | Example C1 | Example 1 | Example C2 | Example C3 | Example 2 | Example C4 |
|---|---|---|---|---|---|---|
| Acrylate resin PAC1 from 1.4. | 25.8 | 25.8 | 25.8 | 25.8 | 25.8 | 25.8 |
| Luwipal 018 BX [1] | 25.3 | 25.3 | 25.3 | 25.3 | 25.3 | 25.3 |
| Adduct (A1) from 1.2. | 0 | 5.0 | 0 | 0 | 5.0 | 0 |
| Addukt (AV1) from 1.1. | 0 | 0 | 5.00 | 0 | 0 | 5.00 |
| Desmodur PL 350 [2] | 7.6 | 0 | 0 | 7.6 | 0 | 0 |
| Rheological assistant from 1.5. | 21 | 21 | 21 | 21 | 21 | 21 |
| Solvent mixture [3] | 0 | 1.9 | 1.9 | 0 | 1.9 | 1.9 |
| Xylene | 1.185 | 1.185 | 1.185 | 1.185 | 1.185 | 1.185 |
| Solventnaphta ® | 7.9 | 7.9 | 7.9 | 7.9 | 7.9 | 7.9 |
| Byk 310 [4] | 0 | 0 | 0 | 0.1 | 0.1 | 0.1 |
| Baysilon OL 17 [5] | 0 | 0 | 0 | 0.015 | 0.015 | 0.015 |
| Tinuvin 5941-R [6] | 0.85 | 0.85 | 0.85 | 0.85 | 0.85 | 0.85 |
| Tinuvin 292 [7] | 0.05 | 0.05 | 0.05 | 0.05 | 0.05 | 0.05 |
| Solvesso 150 [8] | 6.7 | 6.7 | 6.7 | 6.7 | 6.7 | 6.7 |
| Butylglycol diacetate | 1 | 1 | 1 | 1 | 1 | 1 |
| Catalyst (C1) from 1.3. | 0 | 1 | 1 | 0 | 1 | 1 |
| Nacure 4167 [9] | 0.5 | 0.5 | 0.5 | 0.5 | 0.5 | 0.5 |
| Butanol | 2 | 2 | 2 | 2 | 2 | 2 |
| Flow control agent [10] | 0.7 | 0.7 | 0.7 | 0.7 | 0.7 | 0.7 |

Footnotes to Table 1:
[1] Luwipal 018 BX = commercial, partially butanol-etherified melamine-formaldehyde resin from BASF AG, 64-68% in 2:1 n-butanol/xylene
[2] Desmodur PL 350 = commercial aliphatic blocked isocyanate from Bayer, 75% in 11/14 1-methoxyprop-2-ylacetate/Solventnaphta ®
[3] Solvent mixture consisting of 1-methoxyprop-2-ylacetate and Solventnaphta ® in a ratio of 11:14
[4] Byk ® 310 = commercial flow control additive based on a 25% strength solution in xylene of a polyester-modified polydimethylsiloxane, from Byk-Chemie GmbH, Wesel
[5] Baysilon OL 17 = commercial flow control additive from Borchers GmbH
[6] Tinuvin ® 5941-R = commercial mixture of different light stabilizers from Ciba Specialty Chemicals Inc.
[7] Tinuvin ® 292 = commercial light stabilizer based on sterically hindered amines (HALS) from Ciba Specialty Chemicals Inc.
[8] Solvesso 150 = commercial solvent mixture
[9] Nacure 4167 = commercial catalyst from King Industries based on an amine-blocked partial ester of phosphoric acid
[10] Acrylate-based flow control agent with a solids content of 65%, an acid number of 3 mg KOH/g (based on the solids), and of a viscosity at 23° C. of 3 dPa · s

3. Production of the Coatings

The individual 1K clearcoat materials as per Table 1 were applied to metal test panels which had each been coated with a typical, known, cathodically deposited and thermally cured electrocoat, a typical, known, thermally cured surfacer coat, and a film of a commercial, conventional black basecoat material from BASF Coatings AG that had been subjected to after 10 double rubs. Furthermore, the König pendulum damping was investigated using the 299/300 model from Erichsen GmbH & Co. KG, Hemer-Sundwig. The figure reported is the number of swings. The micropenetration hardness was determined in accordance with DIN 55676 using the Fischerscope instrument from Helmut Fischer GmbH & Co., with a maximum force of 25.6 mN. The results are set out in Table 2.

TABLE 2

Results of the crockmeter test, micropenetration hardness,
and König pendulum damping (number of swings)

| Test | Clearcoat of Example C1 | Clearcoat of Example 1 | Clearcoat of Example C2 | Clearcoat of Example C3 | Clearcoat of Example 2 | Clearcoat of Example C4 |
|---|---|---|---|---|---|---|
| Micropenetration hardness [N/mm$^2$] | 98 | 125 | 121 | 112 | 120 | 117 |
| König pendulum damping | 58 | 67 | 61 | 59 | 70 | 64 |
| Residual gloss after crockmeter test [%] | 23% | 90% | 47% | 59% | 87% | 68% |

The results show that the dry scratch resistance in particular is increased significantly as a result of adding the surface-modified adduct (A1) together with the catalyst (C) (Example 1). If the non-surface-modified adduct (AV1) is used (Example C2) in contrast, the improvement in particular in the dry scratch resistance is significantly less pronounced. Example C3 shows that other surface-active substances as well, such as commercial flow control agents, for example, do lead to an improvement in the properties, but one which is substantially less pronounced than when the surface-modified adduct (A1) is added. Only if the adduct (A) has surface-active structures (O) is it possible for a gradient structure with a dense, highly scratch-resistant Si—O—Si network to form at the surface, this network developing the outstanding properties on the surface. A gradient structure of this kind can be detected, for example, by means of X-ray photoelectron spectroscopy and with the aid of transmission electron microscopy together with EDX (energy-dispersive X-ray spectroscopy).

The physicomechanical properties can also be determined with local and depth resolution by means of nanoindentation, using for example the TriboIndenter® nanoindentation instrument from Hysitron Inc. The experimental implementation of this test takes place as follows: the impression body used is a three-sided diamond pyramid in Berkovich geometry (opening angle 142.3°) with an extremely pointed tip (radius<100 nm). This body is then pressed for 10 s into the surface of the coating, with a force increasing linearly up to a maximum of 5 mN, the penetration depth being between 1 µm and 1.5 µm, is held there for a further 30 s under maximum force, and over the next 10 s is withdrawn from the surface with a linearly falling force. From the resulting dataset of force versus depth of penetration, the known algorithm of *Oliver and Pharr* (cf. W. C. Oliver, G. M. Pharr, Journal of Materials Research. 7 (1992), 1565, G. M. Pharr, Materials Science and Engineering A 253 (1998), 151) is used to determine the mechanical data of the analyzed material with local resolution.

To illustrate the influence of the catalyst (C), the clearcoat materials of Example 1 (=Comparative Example C5) and of Comparative Example C2 (=Comparative Example 6) were repeated with omission of the catalyst (C1) and, in the same way as for Examples 1 and C2, coatings C5 and C6 were produced and their micropenetration hardness and dry scratch resistance in the crockmeter test were measured. The results are set out in Table 3. They show that the micropenetration hardness and the scratch resistance of the coatings without catalyst (C) come out much lower than in the corresponding examples with catalyst.

TABLE 3

Results of Comparative Examples C5 and C6

| Test | Clearcoat of Example 1 | Clearcoat of Example C5 | Clearcoat of Example C2 | Clearcoat of Example 6 |
|---|---|---|---|---|
| Micropenetration hardness [N/mm$^2$] | 125 | 98 | 121 | 100 |
| Residual gloss after crockmeter test [%] | 90% | 73% | 47% | 30% |

In addition, the coatings of Examples 1 and 2 and of Comparative Examples C1 to C4 were investigated using ARXPS (=angle-dependent photoelectron spectroscopy). The results are set out in Table 4. The information depth, for detecting the gradient, was varied via exit angle variation or sputter depth profile analysis.

All the XPS measurements were carried out on a small-spot spectrometer from Physical Electronics, with the model identification PHI 5600 LS. The X-rays were always generated using the Mg tube (1253.6 keV). The detection of the photoelectrons, with a pass energy of 23.5 eV, used the following bond levels to determine the atomic concentrations: for Si, the 2p level, for O, the 1s level, and for C as well the 1s level. By varying the angle of detection of the photoelectrons—that is, the angle between the sample surface and the axis of the electronic lenses in front of the electron spectrometer—the depth at which the measurement signals are generated (information depth) was changed: at 5° the information depth is about 1.2 nm (XPS(Si) 1.2 nm), at 45° about 10 nm (XPS(Si) 10 nm). At the detection angle of 45° the measurement area has a diameter of 800 µm; at 5° it has undergone corresponding elliptic enlargement. Following preparation of sections with a microtome, parallel to the surface and approximately 10 µm below the surface, a reference value can be obtained at a comparative depth in material (XPS(Si) 10 µm).

TABLE 4

Results of ARXPS (=angle-dependent photoelectron spectroscopy) measurements

| Measurement value | Clearcoat of Example C1 | Clearcoat of Example 1 | Clearcoat of Example C2 | Clearcoat of Example C3 | Clearcoat of Example 2 | Clearcoat of Example C4 |
|---|---|---|---|---|---|---|
| Si (XPS, 1.2 nm) | 1.3% | 11.8% | 1.6% | 12.0% | 15.2% | 12.3% |
| Si (XPS, 10 nm) | 0.4% | 5.7% | 1.5% | 5.5% | 8.2% | 5.6% |

TABLE 4-continued

Results of ARXPS (=angle-dependent photoelectron spectroscopy) measurements

| Measurement value | Clearcoat of Example C1 | Clearcoat of Example 1 | Clearcoat of Example C2 | Clearcoat of Example C3 | Clearcoat of Example 2 | Clearcoat of Example C4 |
|---|---|---|---|---|---|---|
| Si (XPS) 10 μm | <0.2% | 1.4% | 1.5% | 0.1% | 0.9% | 0.5% |
| O (XPS, 1.2 nm) | 13% | 19.5% | 17.4% | 20.9% | 22.1% | 21.3% |
| $X_{surf} - X_{vol}$ | 1.2% | 10.0% | <0.1% | 11.9% | 14.3% | 11.8% |
| XPS(Si 1.2 nm)/ XPS(Si 10 μm) | 6.5 | 8.4 | 1 | 120 | 16.9 | 24.6 |
| XPS(Si)/ XPS(O) | 0.1 | 0.6 | 0.09 | 0.57 | 0.69 | 0.58 |
| XPS(Si 1.2 nm)/ XPS(Si 10 nm) | 3.25 | 2.07 | 1.07 | 2.18 | 1.85 | 2.20 |
| tau | 0.007 μm | 0.01 μm | no gradient | 0.01 μm | 0.01 μm | 0.01 μm |

The following nomenclature is used additionally to characterize the results of the photoelectron spectroscopy:

XPS(Si) 1.2 nm stands for the fraction of the detected atoms (in this case silicon) measured from an information depth of 1.2 nm from the surface of the coating material. The totality of the atomic species detectable by XPS at the stated information depth is reported as 100%. As the skilled worker is aware, hydrogen, for example, cannot be detected by XPS.

Figure 2:
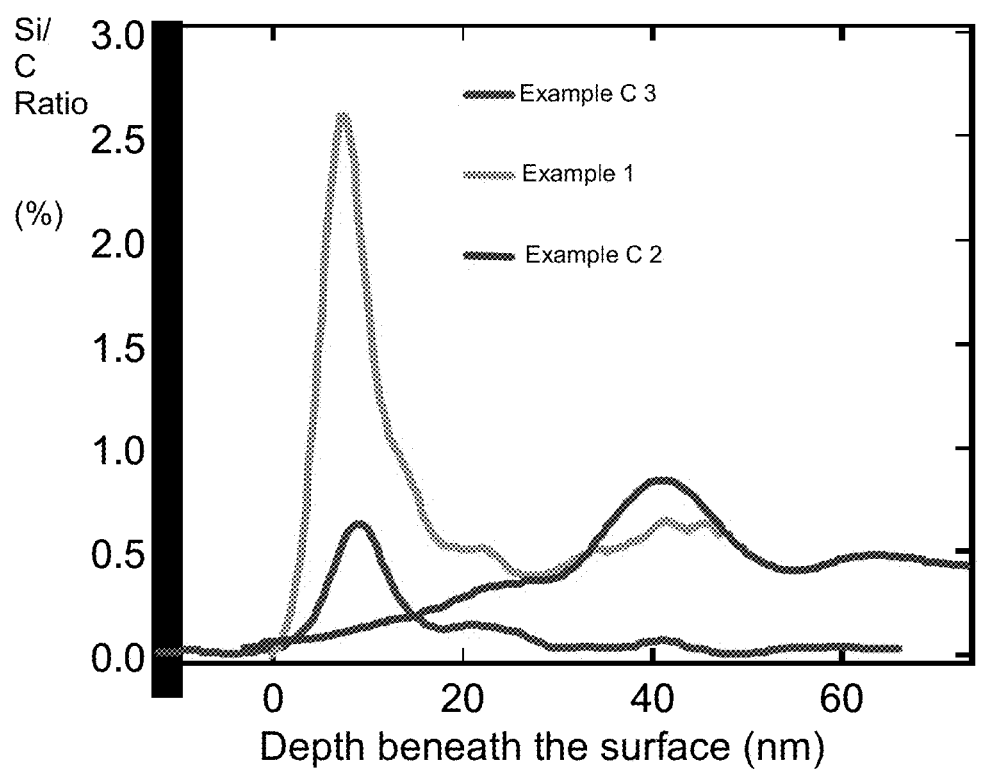
FIG. 2 graphically illustrates the Si/C ratios for the coatings of Example 1 and Comparative Examples C2 and C3.

Lastly, the coatings of Example 1 and of Comparative Examples C2 and C3 were investigated by transmission electron microscopy together with EDX (energy-dispersive x-ray spectroscopy). The results are shown in FIG. 2. FIG. 2 gives the Si/C atomic ratios for the coatings of Example 1 and of the Comparative Examples C2 and C3. FIG. 2 illustrates the accumulation of the surface-modified adduct (A1), while the non-surface-modified adduct (AV1) shows only very little accumulation in the near-surface zone.

5.1. Preparation of a Surface-Modified Adduct (A2)

A reaction vessel equipped with stirrer, reflux condenser, oil heating, and nitrogen inlet tube was charged with 100 parts by weight of a commercial isocyanurate of hexamethylene diisocyanate (Desmodur® N 3600 from Bayer AG). Added slowly to this initial solution of the isocyanurate, with stirring, was a solution of 2.5 parts by weight of a carbinol-functional siloxane (Baysilone® OF 502 6% from GE-Bayer Silicones) in 0.625 part by weight of the commercial aromatic solvent Solventnaphta®. Following the addition, the reaction mixture was heated to 55° C. and stirred at 55° C. for a further 2 hours. Next, slowly and with stirring, 184 parts by weight of N,N-bis(3-trimethoxysilylpropan-1-yl)amine (Dynasylan® 1124 from Degussa) were added to the mixture. Stirring was then carried out at 55° C. for a further two hours. Thereafter free isocyanate groups were no longer detectable by IR spectroscopy. The resulting compound (A2) had a solids content of 89%. The surface tension of the resulting compound (A2) was found by the ring method to be 27.0 mN/m.

5.2. Preparation of a Surface-Modified Adduct (A3)

A reaction vessel equipped with stirrer, reflux condenser, oil heating, and nitrogen inlet tube was charged with 100 parts by weight of a commercial isocyanurate of hexamethylene diisocyanate (Desmodur® N 3600 from Bayer AG). Added slowly to this initial solution of the isocyanurate, with stirring, was a solution of 5 parts by weight of a carbinol-functional siloxane (Baysilone® OF 502 6% from GE-Bayer Silicones) in 1.25 parts by weight of the commercial aromatic solvent Solventnaphta®. Following the addition, the reaction mixture was heated to 55° C. and stirred at 55° C. for a further 2 hours. Next, slowly and with stirring, 181 parts by weight of N,N-bis(3-trimethoxysilylpropan-1-yl)amine (Dynasylan® 1124 from Degussa) were added to the mixture. Stirring was then carried out at 55° C. for a further two hours. Thereafter free isocyanate groups were no longer detectable by IR spectroscopy. The resulting compound (A3) had a solids content of 90%. The surface tension of the resulting compound (A3) was found by the ring method to be 26.5 mN/m.

5.3. Preparation of a Surface-Modified Adduct (A4)

A reaction vessel equipped with stirrer, reflux condenser, oil heating, and nitrogen inlet tube was charged with 100 parts by weight of a commercial isocyanurate of hexamethylene diisocyanate (Desmodur® N 3600 from Bayer AG). Added slowly to this initial solution of the isocyanurate, with stirring, was a solution of 10 parts by weight of a carbinol-functional siloxane (Baysilone® OF 502 6% from GE-Bayer Silicones) in 2.5 parts by weight of the commercial aromatic solvent Solventnaphta®. Following the addition, the reaction mixture was heated to 55° C. and stirred at 55° C. for a further 2 hours. Next, slowly and with stirring, 175 parts by weight of N,N-bis(3-trimethoxysilylpropan-1-yl)amine (Dynasylan® 1124 from Degussa) were added to the mixture. Stirring was then carried out at 55° C. for a further two hours. Thereafter free isocyanate groups were no longer detectable by IR spectroscopy. The resulting compound (A4) had a solids content of 91%. The surface tension of the resulting compound (A4) was found by the ring method to be 26.5 mN/m.

5.4. Preparation of a Hydroxyl-Containing Polyacrylate (PAC 2)

A reactor flushed with nitrogen and with a condenser attached was charged with 17.5 parts by weight of pentyl acetate, and this initial charge was heated to 140° C. with stirring. In parallel with this, two separate feed streams were prepared. Feed stream 1 consisted of 28.58 parts by weight of 2-hydroxypropyl methacrylate, 11.93 parts by weight of cyclohexyl methacrylate, 14.44 parts by weight of ethylhexyl methacrylate, 6.88 parts by weight of ethylhexyl acrylate, and 0.15 part by weight of acrylic acid. Feed stream 2 consisted of 2.945 parts by weight of Solventnaphta® and 8.06 parts by weight of peroxide TBPEH (=tert-butyl hydroperoxide). When the temperature of 140° C. had been reached, feed stream 2 was metered in slowly and uniformly over a period of 285 minutes. 15 minutes after the start of feed stream 2, feed stream 1 was metered slowly and uniformly into the reactor over a period of 240 minutes. After the end of the metering of feed stream 2, the reaction mixture was stirred at 140° C. for a further 120 minutes for postpolymerization. The solids content of the resulting product was found to be 65%, the acid number 5-7 mg KOH/g and the OH number 180 mg KOH/g (in each case based on the solids) and the viscosity 19.5 dPas at 23° C.

5.5. Preparation of a Catalyst (C2) Based on an Amine-Blocked Phosphoric Ester A reactor equipped with a dropping funnel and a reflux condenser was charged with 32.4 parts by weight of ethyl hexyl phosphate and 50 parts by weight of methoxypropyl acetate and this initial charge was homogenized. Subsequently, with cooling and stirring, 17.6 parts by weight of triethylamine were added dropwise at a rate such that the temperature did not exceed 60° C. Following addition of the triethylamine, the reaction mixture was stirred at room temperature for 2 hours more. The resulting reaction product had a solids content of 50.0%.

6. Preparation of 2-Component (2K) Clearcoat Materials

The raw materials set out in Table 5 were combined in succession in the quantities indicated, and homogenized, in order to prepare the millbase clearcoat materials.

TABLE 5

Composition of the 2-component clearcoats of Examples 3 to 5 and of Comparative Example C7

| Ingredient [parts by weight] | Example C7 | Example 3 | Example 4 | Example 5 |
|---|---|---|---|---|
| Polyacrylate (PAC2) from 6.4. | 73.5 | 73.5 | 73.5 | 73.5 |
| Butyldiglycol acetate | 8.5 | 8.5 | 8.5 | 8.5 |
| Butanol | 0.15 | 0.15 | 0.15 | 0.15 |
| Tinuvin 5941-R[1] | 1.86 | 1.86 | 1.86 | 1.86 |
| Tinuvin 292[2] | 0.24 | 0.24 | 0.24 | 0.24 |
| Byk ® 320[3] | 0.15 | 0.15 | 0.15 | 0.15 |
| Byk ® 306[4] | 0.20 | 0.20 | 0.20 | 0.20 |
| Solventnaphta ® | 3 | 3 | 3 | 3 |
| Butyl acetate | 3.63 | 3.63 | 3.63 | 3.63 |
| Ethoxypropyl acetat | 4.77 | 4.77 | 4.77 | 4.77 |
| Butylglycol acetate | 4 | 4 | 4 | 4 |
| Catalyst (C2) from 5.5. | 0 | 2 | 2 | 2 |
| Adduct (A2) from 5.1. | 0 | 30 | 0 | 0 |
| Adduct (A3) from 5.2. | 0 | 0 | 30 | 0 |
| Adduct (A4) from 5.3. | 0 | 0 | 0 | 30 |

Notes on Table 5:
Tinuvin ® 5941-R = commercial mixtures of different light stabilizers from Ciba Specialty Chemicals Inc.
Tinuvin ® 292 = commercial light stabilizer based on sterically hindered amines (HALS) from Ciba Specialty Chemicals Inc.
Byk ® 320 = commercial flow control additive based on a 52% strength solution of a polyether-modified polymethylalkylsiloxane, from Byk-Chemie GmbH, Wesel
Byk ® 306 = commercial flow control additive based on a 12.5% strength solution of a polyether-modified polydimethylsiloxane in 7/2 xylene/monophenylglycol, from Byk-Chemie GmbH, Wesel Immediately prior to application, 33 parts by weight of curative were added to 100 parts by weight of millbase, and the resulting mixture was homogenized. The curative used was prepared by combining and homogenizing the ingredients listed in Table 6.

TABLE 6

| Ingredient | Parts by weight of curative |
|---|---|
| Basonat ® HI 190 (product of BASF AG) | 23 |
| Desmodur ® Z 4470 (70% in SN) | 64 |
| Butyl acetate | 6.5 |
| Solventnaphta ® | 6.5 |

Footnotes to Table 6:
Basonat ® HI 190 = commercial isocyanurate of hexamethylene diisocyanate from BASF AG, 90% in a mixture of Solventnaphta ® and butyl acetate
Desmodur ® Z 4470 = commercial isocyanurate of isophorone diisocyanate from Bayer Material Science AG, 70% in Solventnaphta ®

7. Production of the Coatings

The individual 2K clearcoat materials were applied to metal test panels which had each been coated with a typical, known, cathodically deposited and thermally cured electrocoat, a typical, known, thermally cured surfacer coat, and a film of a commercial, conventional black basecoat material from BASF Coatings AG that had been subjected to initial drying at 80° C. for 10 minutes. The basecoat film and the clearcoat film were cured together at 140° C. for 22 minutes. The resulting basecoat had a film thickness of 7.5 μm, and the clearcoat a film thickness of 40 μm

8. Investigation of the Properties of the Resulting Coatings

All of the surfaces were of high gloss and outstanding appearance. The dry scratch resistance of the resulting surfaces was determined by means of the crockmeter test (9 μm paper grade). This was done by operating along the lines of EN ISO 105-X 12 and evaluating the loss of gloss at 20° C. after 10 double rubs.

TABLE 7

| | Crockmeter test | | | |
|---|---|---|---|---|
| Test | Clearcoat of Example C7 | Clearcoat of Example 3 | Clearcoat of Example 4 | Clearcoat of Example 5 |
| Residual gloss after crockmeter test [%] | 15% | 55% | 60% | 66% |

The results demonstrate that the dry scratch resistance of the formulations can be increased significantly through the addition of the adducts (A2) to (A4) together with the catalyst. The experiments also show that the greater the amount of surface-active adduct (A) employed, the more strongly pronounced the effect.

The clearcoat films of Examples 4, 5, and C 7 were investigated for their weathering over 6000 h in the so-called WOM-CAM 180 Q/B test in accordance with VDA [German Automakers Association] test sheet (E) 621-430 April 97 and/or SAE J1960 JUN89 (referred to below for short as the CAM 180 test). In the CAM 180 test it was found that all of the samples investigated exhibited no cracking even after 6000 h. The gloss of Examples 4 and 5 after 6000 h was identical, within the bounds of measurement accuracy, to the corresponding gloss from Example C 7. This demonstrates the good weathering resistance of the modified 2K clearcoats.

What is claimed is:

1. A coating (K) which has a degree of crosslinking of 5 to 100% comprising:
   1. a near-surface coating zone (K1) and
   2. a volume coating zone (K2),
   a ratio of a dry film thickness of the near-surface coating zone (K1) to a dry film thickness of the volume coating zone (K2) being less than 0.1, and the coating (K) being obtained from a coating composition (B) comprising at least two different crosslinkable components (D1) and (D2), at least part of component (D1) comprising one or more surface-active structural units (O);
   wherein
   (i) the coating (K) both in zone (K1) and in zone (K2) has a degree of crosslinking of 5 to 100%, and
   (ii) the crosslinking density of the coating in zone (K1) is higher than the crosslinking density of the coating in zone (K2),
   wherein the crosslinkable component (D1) comprises at least one reactive radical of the formula (VI):

$$-NR'''-C(O)-N-(L-SiR''_x(OR')_{3-x})_n(L'-SiR''_y(OR')_{3-y})_m \quad (VI)$$

where
R'''=hydrogen, alkyl, cycloalkyl, aryl or aralkyl, the carbon chain being interrupted or not being interrupted by nonadjacent oxygen, sulfur or NRa groups, with Ra=alkyl, cycloalkyl, aryl or aralkyl,
R'=hydrogen, alkyl or cycloalkyl, the carbon chain being interrupted or not being interrupted by nonadjacent oxygen, sulfur or NRa groups,
L, L'=linear and/or branched alkylene or cycloalkylene radical having 1 to 20 carbon atoms,
R''=alkyl, cycloalkyl, aryl or aralkyl, the carbon chain being interrupted or not being interrupted by nonadjacent oxygen, sulfur or NRa groups,
n=0 to 2,
m=0 to 2,
m+n=2, and
x,y=0 to 2, and
the coating composition (B) contains component (D1) in an amount of 0.1 to 35% by weight, based on the nonvolatiles of the coating composition (B).

2. The coating of claim 1, wherein the coating (K) exhibits a chemical disuniformity in the form of a gradient perpendicular to a surface (KO) of the at least partly crosslinked coating (K).

3. The coating of claim 2, wherein the coating (K) exhibits a chemical disuniformity in the form of a gradient of silicon atoms of (Si 1) and/or of (Si 2):

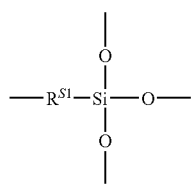

(Si 1)

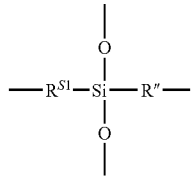

(Si 2)

perpendicular to the surface (KO), where
$R^{S1}$=organic radical, linear and/or branched alkylene or cycloalkylene radical having 1 to 20 carbon atoms,
R''=alkyl, cycloalkyl, aryl or aralkyl, the carbon chain being interrupted or not being interrupted by nonadjacent oxygen, sulfur or NRa groups, with Ra=alkyl, cycloalkyl, aryl or aralkyl.

4. The coating of claim 2, wherein the gradient in the chemical disuniformity leads to a gradient in the physical properties perpendicular to the surface.

5. The coating of claim 2, wherein the gradient has a half-value depth<1 μm.

6. The coating of claim 1, wherein the film thickness of the near-surface coating zone (K1) is between 1 nm and 500 nm.

7. The coating of claim 1, wherein the crosslinkable component (D1) has been prepared by modifying at least part of a precursor of component (D1) and/or at least part of component (D1) with one or more surface-active compounds (OV).

8. The coating of claim 7, wherein
   (i) the surface-active compound (OV) comprises at least one member selected from the group consisting of hydroxyl, epoxy, isocyanate, carbamate, carboxyl, anhydride, amine, thiol, ethylenically unsaturated double bond, and combinations thereof, and/or
   (ii) the crosslinkable component (D1) and/or a precursor of the crosslinkable component (D1) comprises at least one complementary functional group selected from the group consisting of hydroxyl, epoxy, isocyanate, carbamate, carboxyl, anhydride, amine, thiol, ethylenically unsaturated double bonds, and combinations thereof.

9. The coating of claim 8, wherein the compound (OV) is a siloxane of the formula (I):

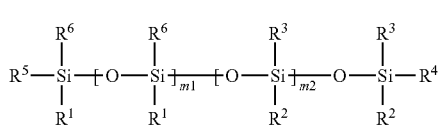

(I)

where
$R^1$ to $R^6$ are identical or different radicals and
$R^1$=alkyl, cycloalkyl, aryl or aralkyl radical, the carbon chain being interrupted or not being interrupted by nonadjacent oxygen, sulfur or NRa groups, or fluorine-substituted alkyl, cycloalkyl, aryl or aralkyl radicals,
$R^2$=hydroxyl, alkyl, cycloalkyl, aryl or aralkyl radical, the carbon chain being interrupted or not being interrupted by nonadjacent oxygen, sulfur or NRa groups,
$R^3$ and $R^6$=hydrogen, alkyl, cycloalkyl, aryl or aralkyl radical, the carbon chain being interrupted or not being interrupted by nonadjacent oxygen, sulfur or NRa groups, or fluorine-substituted alkyl, cycloalkyl, aryl or aralkyl radicals,
$R^4$ and $R^5$=hydrogen, hydroxyl, alkyl, cycloalkyl, aryl or aralkyl radical, the carbon chain being interrupted or not being interrupted by nonadjacent oxygen, sulfur or NRa groups, at least one of the radicals R², R⁴, and R⁵ additionally carrying a functional group which is reactive toward the complementary functional groups of component (D1), and $m_1$=1 to 80, and
$m_2$=0 to 80.

10. The coating of claim 8, wherein the compound (OV) is a siloxane of the formula (III):

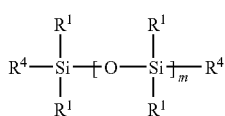

(III)

where
R¹=alkyl, cycloalkyl, aryl or aralkyl radical, the carbon chain possibly being interrupted by nonadjacent oxygen, sulfur or NRa groups, or fluorine-substituted alkyl, cycloalkyl, aryl or aralkyl radicals, and R⁴=hydrogen, hydroxyl, alkyl, cycloalkyl, aryl or aralkyl radical, the carbon chain possibly being interrupted by nonadjacent oxygen, sulfur or NRa groups, and
m=1 to 80.

11. The coating of claim 1, wherein the coating composition (B) contains a catalyst (C) in an amount of 0.1 to 15% by weight, and/or component (D2) in an amount of 50 to 99.8% by weight, based in each case on the nonvolatiles of the coating composition (B).

12. The coating of claim 1, wherein the crosslinkable component (D2) is composed of one or more binders (BM).

13. The coating of claim 12, wherein the binders (BM) are selected from the group consisting of oligomeric and/or polymeric compounds which have acrylate groups, methacrylate groups, hydroxyl groups, carbamate groups, epoxy groups, isocyanate groups, and carboxyl groups.

14. A multicoat effect and/or color paint system comprising at least one pigmented coating and, disposed thereon, a transparent coating, wherein the transparent coating is the coating of claim 1.

15. A process for producing the multicoat paint system of claim 14, wherein a substrate is coated with at least one pigmented coating composition and at least part of the resulting pigmented coating is coated with at least one transparent coating composition (B) of claim 1, and curing is carried out.

16. A coating (K) which has a degree of crosslinking of 5 to 100% comprising:
1. a near-surface coating zone (K1) and
2. a volume coating zone (K2),
wherein
(I) a ratio of a dry film thickness of the near-surface coating zone (K1) to a dry film thickness of the volume coating zone (K2) being less than 0.1, and the coating (K) is obtained from a coating composition (B) comprising at least two different crosslinkable components (D1) and (D2), at least part of component (D1) having one or more surface-active structural units (O), and
(II) the concentration of component (D1) in the near-surface coating zone (K1) being higher than in the volume coating zone (K2), the coating (K) both in zone (K1) and in zone (K2) has a degree of crosslinking of 5 to 100%, wherein the micropenetration hardness and/or the dry scratch resistance of the coating (K) is higher than the micropenetration hardness and/or the dry scratch resistance of coating (K') obtainable from a coating composition (B') which contains no crosslinkable component (D1),
wherein the crosslinkable component (D1) comprises at least one reactive radical of the formula (VI):

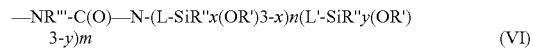

(VI)

where
R'''=hydrogen, alkyl, cycloalkyl, aryl or aralkyl, the carbon chain being interrupted or not being interrupted by nonadjacent oxygen, sulfur or NRa groups, with Ra=alkyl, cycloalkyl, aryl or aralkyl,
R'=hydrogen, alkyl or cycloalkyl, the carbon chain being interrupted or not being interrupted by nonadjacent oxygen, sulfur or NRa groups,
L, L'=linear and/or branched alkylene or cycloalkylene radical having 1 to 20 carbon atoms,
R''=alkyl, cycloalkyl, aryl or aralkyl, the carbon chain being interrupted or not being interrupted by nonadjacent oxygen, sulfur or NRa groups,
n=0 to 2,
m=0 to 2,
m+n=2, and
x,y=0 to 2, and
the coating composition (B) contains component (D1) in an amount of 0.1 to 35% by weight, based on the nonvolatiles of the coating composition (B).

17. A method of controlling the properties of coatings (K) which have a degree of crosslinking of 5 to 100%, wherein the coating (K) is composed of a near-surface coating zone (K1) and a volume coating zone (K2), a ratio of a dry film thickness of the near-surface coating zone (K1) to a dry film thickness of the volume coating zone (K2) being less than 0.1, and the coating (K) is produced from a coating composition (B) comprising at least two different crosslinkable components (D1) and (D2), at least part of component (D1) comprising one or more surface-active structural units (O);
wherein
(i) the crosslinking density of the network (N1) formed from component (D1) is higher than the crosslinking density of the network (N2) formed from component (D2), and
(ii) the properties of the coating are controlled by way of the ratio of the crosslinking density of the network (N1) formed from component (D1) to the crosslinking density of the network (N2) formed from component (D2),
wherein the coating (K) in both zone (K1) and in zone (K2) has a degree of crosslinking of 5 to 100%, and the crosslinkable component (D1) comprises at least one reactive radical of the formula (VI):

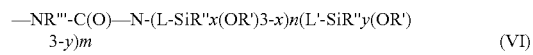

(VI)

where
R'''=hydrogen, alkyl, cycloalkyl, aryl or aralkyl, the carbon chain being interrupted or not being interrupted by nonadjacent oxygen, sulfur or NRa groups, with Ra=alkyl, cycloalkyl, aryl or aralkyl,
R'=hydrogen, alkyl or cycloalkyl, the carbon chain being interrupted or not being interrupted by nonadjacent oxygen, sulfur or NRa groups,
L, L'=linear and/or branched alkylene or cycloalkylene radical having 1 to 20 carbon atoms,
R''=alkyl, cycloalkyl, aryl or aralkyl, the carbon chain being interrupted or not being interrupted by nonadjacent oxygen, sulfur or NRa groups, n=0 to 2, m=0 to 2, m+n=2, and x,y=0 to 2, and the coating composition (B) contains component (D1) in an amount of 0.1 to 35% by weight, based on the nonvolatiles of the coating composition (B).

18. The method of claim 17, wherein the near-surface coating zone (K1) is formed substantially by the component (D1) having a degree of crosslinking of 5 to 100% and the volume coating zone (K2) is formed substantially by the component (D2) having a degree of crosslinking of 5 to 100%.

\* \* \* \* \*